United States Patent
Bui et al.

(10) Patent No.: US 10,778,820 B2
(45) Date of Patent: Sep. 15, 2020

(54) ELECTRONIC DEVICE FOR PREVENTING DEFORMATION OF A DISPLAY PANEL

(71) Applicant: SAMSUNG ELECTRONICS CO., LTD., Suwon-si (KR)

(72) Inventors: Dac Tri Bui, Hai Duong (VN); Van Hoang Nguyen, Hanoi (VN); Van Duc Le, Thanh Hoa (VN); Quoc Chien Nguyen, Ha Nam (VN); Van Quan Hoang, Thanh Hoa (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 15/905,021

(22) Filed: Feb. 26, 2018

(65) Prior Publication Data

US 2019/0245957 A1     Aug. 8, 2019

(30) Foreign Application Priority Data

Feb. 6, 2018   (KR) ........................ 10-2018-0014722

(51) Int. Cl.
*H04M 1/02*      (2006.01)
*H04B 1/3883*    (2015.01)
*H04B 1/3888*    (2015.01)

(52) U.S. Cl.
CPC ........ *H04M 1/0262* (2013.01); *H04B 1/3883* (2013.01); *H04B 1/3888* (2013.01)

(58) Field of Classification Search
CPC . H04M 1/0262; H04B 1/3882; H04B 1/3883; H04B 1/3888

USPC ............ 361/600, 688, 690, 692, 704, 709, 361/714–715; 455/347, 550.1, 566, 455/572–573, 575.1, 575.8

See application file for complete search history.

(56) References Cited

U.S. PATENT DOCUMENTS

| | | | | |
|---|---|---|---|---|
| 6,534,213 | B1 * | 3/2003 | Tanaka ................ | H01M 2/1022 429/100 |
| 2009/0274953 | A1 * | 11/2009 | Myers ................. | H01M 2/1066 429/100 |
| 2011/0001912 | A1 * | 1/2011 | Ninomiya ............. | G02B 1/118 349/137 |
| 2012/0196161 | A1 * | 8/2012 | Yang ................... | H01M 2/0212 429/53 |
| 2015/0062823 | A1 * | 3/2015 | Seo ........................ | B32B 38/10 361/704 |

(Continued)

FOREIGN PATENT DOCUMENTS

JP         4480456 B2     6/2010
JP      2005327477    *   6/2010

(Continued)

*Primary Examiner* — Yuwen Pan
*Assistant Examiner* — Angelica M Perez
(74) *Attorney, Agent, or Firm* — Sughrue Mion, PLLC

(57) ABSTRACT

Provided is an electronic device including: a battery; a housing; a battery tape adhering the battery and the housing; a display screen provided at a front surface of the housing; a display tape adhering the display screen and the housing; a chamber adjacent to the battery; and an air path that connects to the chamber that prevents the chamber from being airtight. Such an electronic device may prevent the display screen from being deformed due to heat and air expansion caused by a temperature change in the chamber.

19 Claims, 18 Drawing Sheets

(56) References Cited

U.S. PATENT DOCUMENTS

| | | | |
|---|---|---|---|
| 2016/0093846 A1* | 3/2016 | Malinski | H01M 2/1066 |
| | | | 429/100 |
| 2018/0159097 A1* | 6/2018 | Fukushima | H04N 5/2252 |
| 2019/0098121 A1* | 3/2019 | Jeon | H04B 1/38 |

FOREIGN PATENT DOCUMENTS

| | | | |
|---|---|---|---|
| JP | 2014017719 | * | 1/2014 |
| KR | 10-2013-0080606 A | | 7/2013 |

* cited by examiner

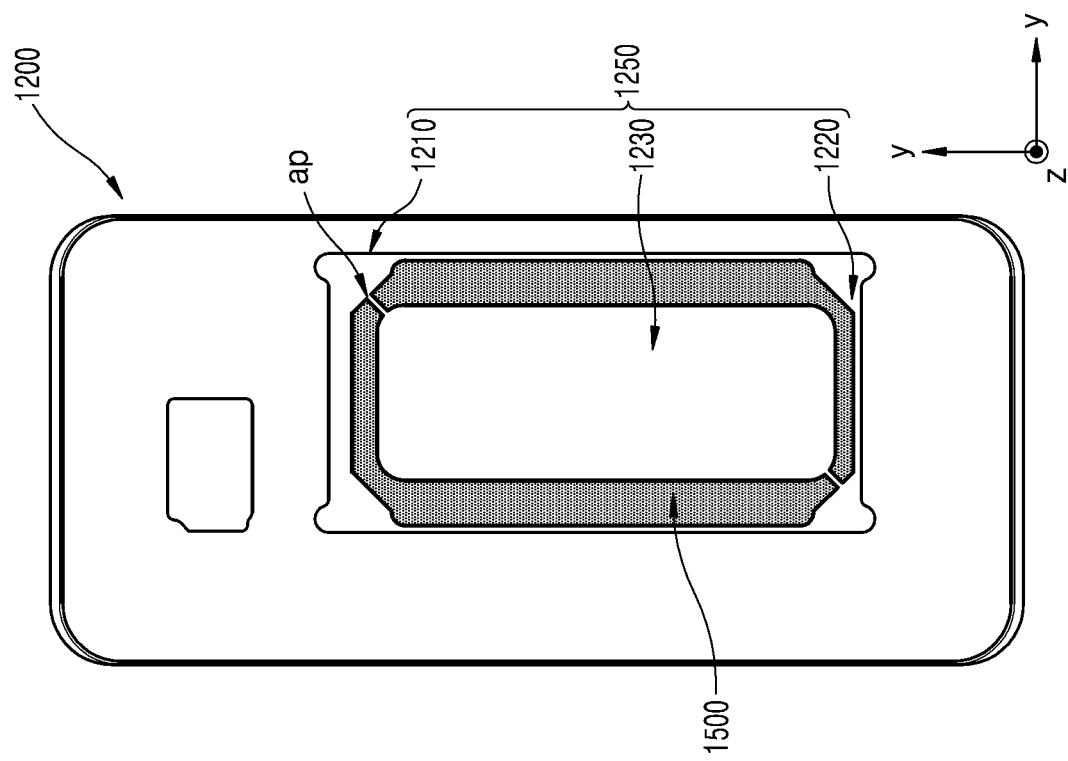
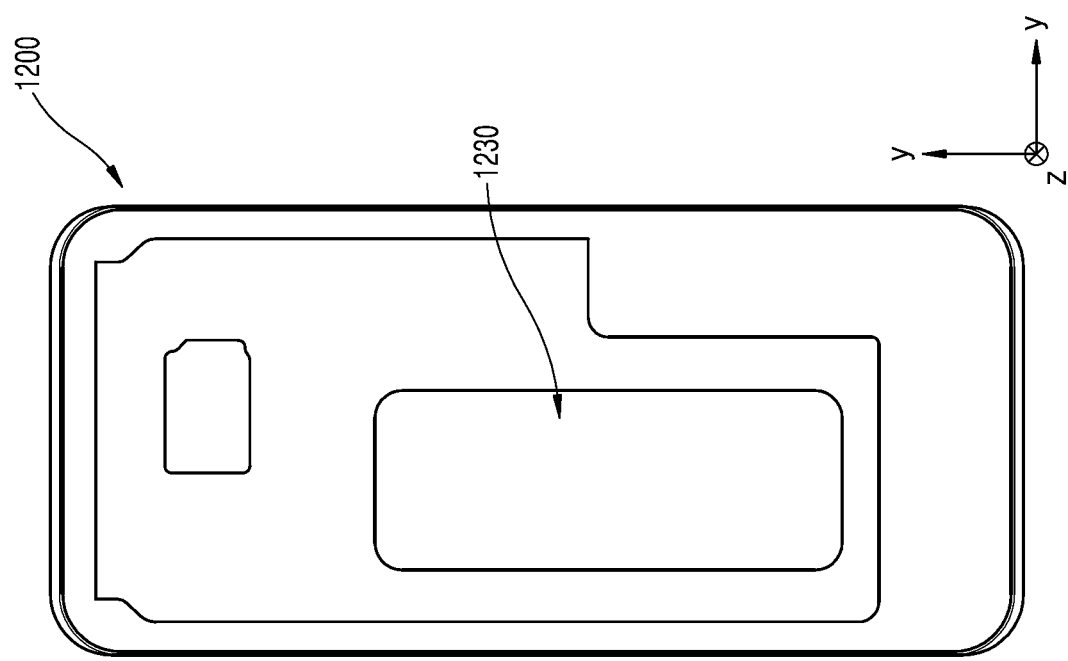

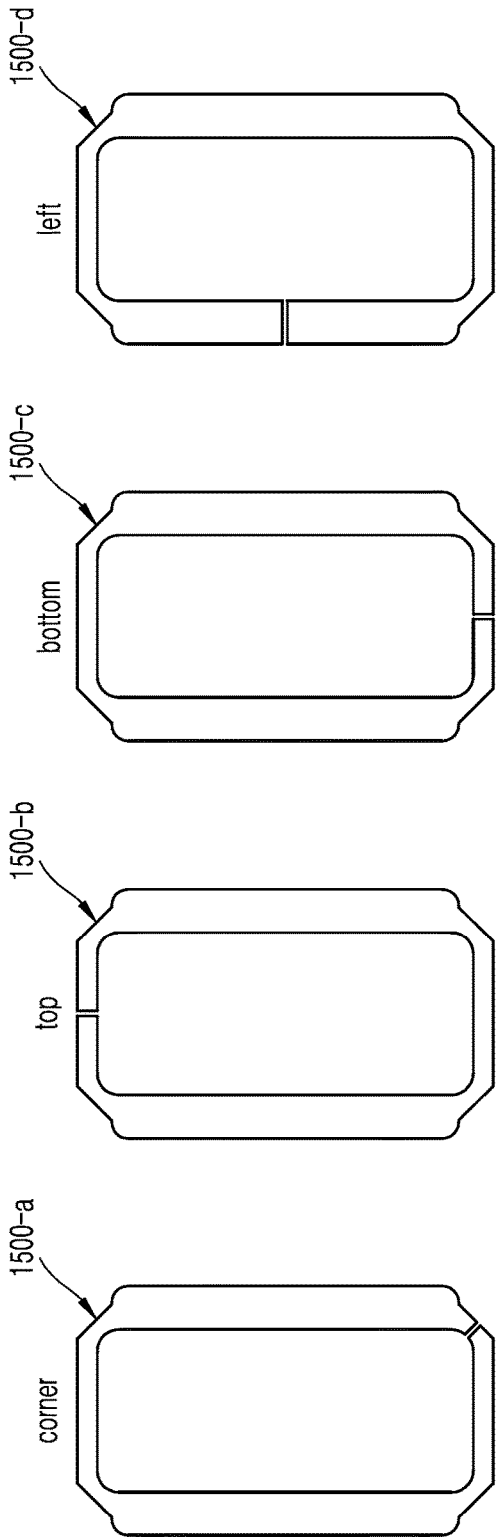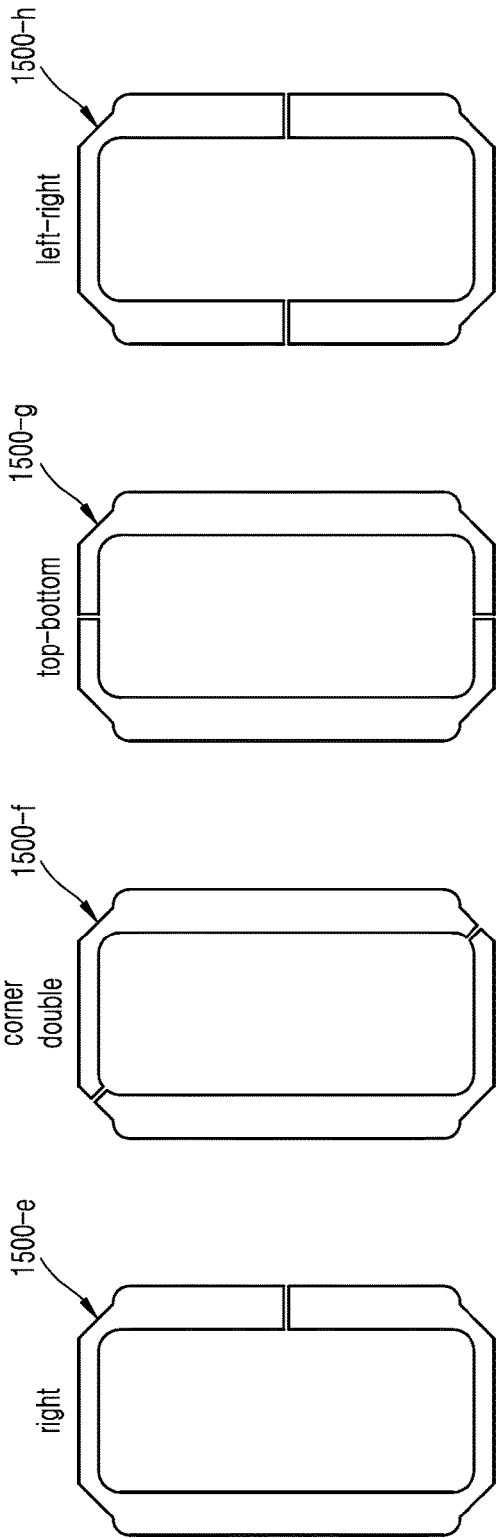

type II type IV type I type III

ELECTRONIC DEVICE FOR PREVENTING DEFORMATION OF A DISPLAY PANEL

CROSS-REFERENCE TO RELATED APPLICATION(S)

This application is based on and claims priority under 35 U.S.C. § 119 to Korean Patent Application No. 10-2018-0014722, filed on Feb. 6, 2018, in the Korean Intellectual Property Office, the disclosure of which is incorporated by reference herein in its entirety.

BACKGROUND

1. Field

The disclosure relates to a structure of an electronic apparatus.

2. Description of Related Art

Portable electronic devices, in particular, smartphones, have been and will continue to be developed. Also, differences with respect to hardware/software between portable devices made by various manufacturers have been gradually reduced. As a result, it is useful to improve not only the performance of the electronic devices, but also the feeling of use and designs.

An electronic device includes a display for data input and output, and such a display may include a curved display having a curved surface that is at least partially bended in a planar form. According to an embodiment, such a curved display may provide a fresh user experience, and help improve a grip.

In the curved display, a display module (for example, a touch screen panel, a display panel, or a polarizing panel) may be attached to a rear surface of a curved window via a certain adhesive tape.

Such a display module is formed of a flexible material that is easily deformed by pressure and heat due to characteristics of the flexible material. In particular, according to integration of portable electronic devices and enlargement of batteries, display modules may be deformed due to thermal expansion and contraction of air trapped in portable electronic devices.

SUMMARY

Provided is a structure of an electronic device capable of preventing deformation of a display panel caused by thermal expansion and contraction of internal air trapped in the electronic device.

Additional aspects will be set forth in part in the description which follows and, in part, will be apparent from the description, or may be learned by practice of the presented embodiments.

In accordance with an aspect of the disclosure, an electronic device includes: a display module (also referred to herein as a "display screen") configured to display an image; a housing including a frame and a rear part connected to a rear surface of the frame, wherein the frame has a battery mounting structure forming a space where a battery is mountable; a display tape adhering a rear surface of the display module to a front surface of the frame; a battery mounted in the space of the battery mounting structure; a battery tape adhering the battery mounting structure to the battery; a chamber adjacent to the battery; and an air path connecting the chamber to another space in the electronic device such that the chamber adjacent to the battery is not airtight.

The battery tape may have a closed loop shape including an inner surface and an outer surface.

The air path may be provided in the battery tape and penetrates the inner surface and the outer surface.

The battery tape may have uneven widths between the inner surface and the outer surface, and the air path may be provided in a region where the width between the inner surface and the outer surface is smallest.

The inner surface of the battery tape may have a plurality of corner regions, and the air path may be provided in at least one of the plurality of corner regions of the inner surface.

At least some parts of the air path may face each other.

The air path may be provided at the display tape.

The display tape may include an opening corresponding region, and the air path may connect the opening corresponding region to an exterior of the display tape.

The air path may connect to an opening corresponding region of the display tape, along a lateral direction.

The display tape may form an opening exposing an opening corresponding region.

The display tape may form an airtight chamber by sealing an opening corresponding region.

The battery mounting structure may include a mounting plate forming an opening that exposes at least a part of a front surface of the battery.

The air path may be provided at the mounting plate.

The air path may extend in a direction extending away from the opening of the mounting plate.

The battery mounting structure may include a battery rib formed along at least one side surface of the battery such that the battery is seated and held in place by the battery rib.

The air path may be provided at the battery.

The air path may extend in a direction extending away from an opening corresponding region of the battery.

The air path may extend to connect to an opening corresponding region of the battery in a lateral direction.

The electronic device may further include a waterproof tape provided between the display module and the housing that is configured to block moisture.

The rear part may include a rear cover and rear glass.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are respectively a front plan view and a rear plan view of a frame, according to an embodiment;

FIGS. 9A through 9H are diagrams showing battery tapes and locations of air paths, according to embodiments;

DETAILED DESCRIPTION

Figure 1:
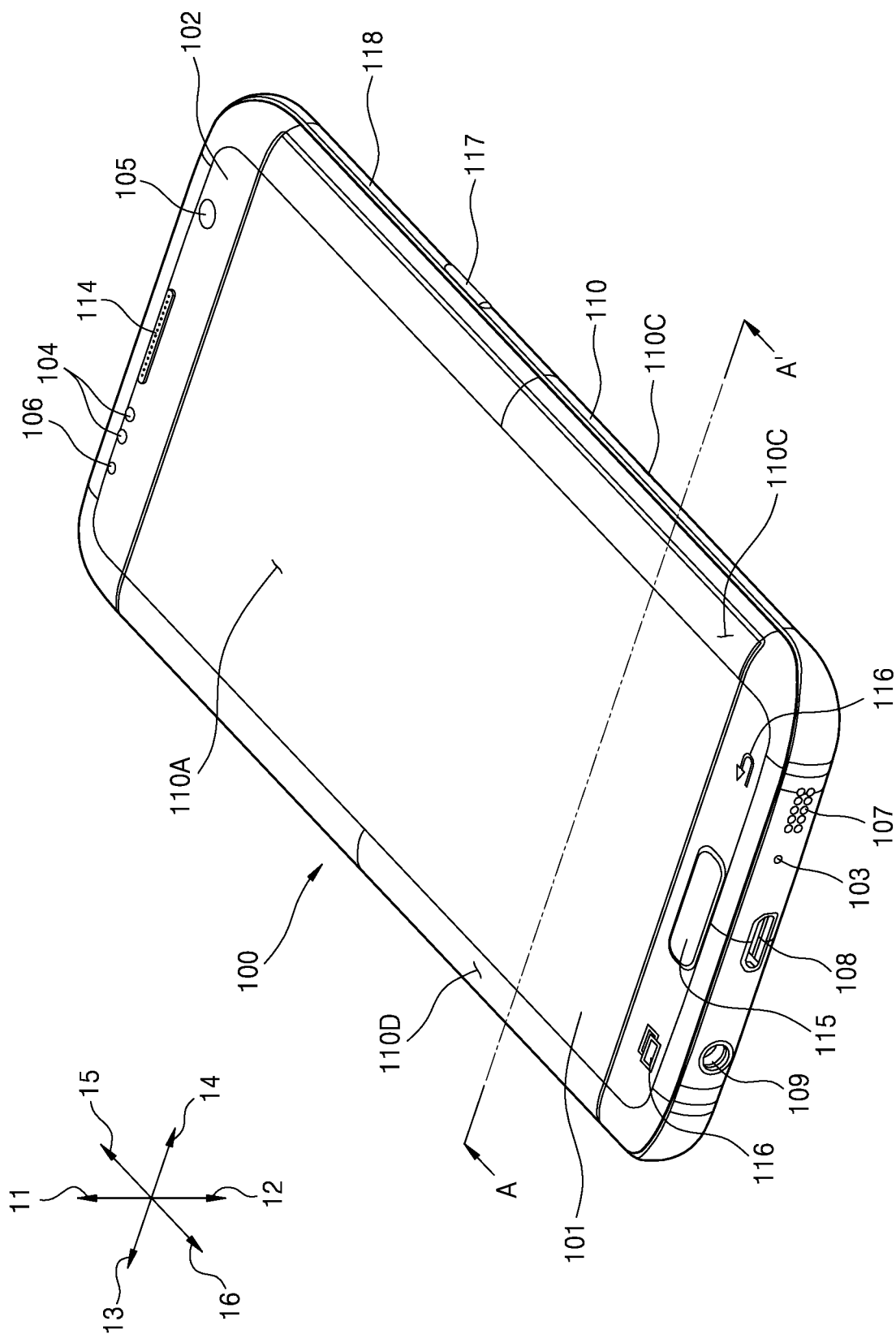
FIG. 1 is a perspective view of a front surface of an electronic device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Figure 2:
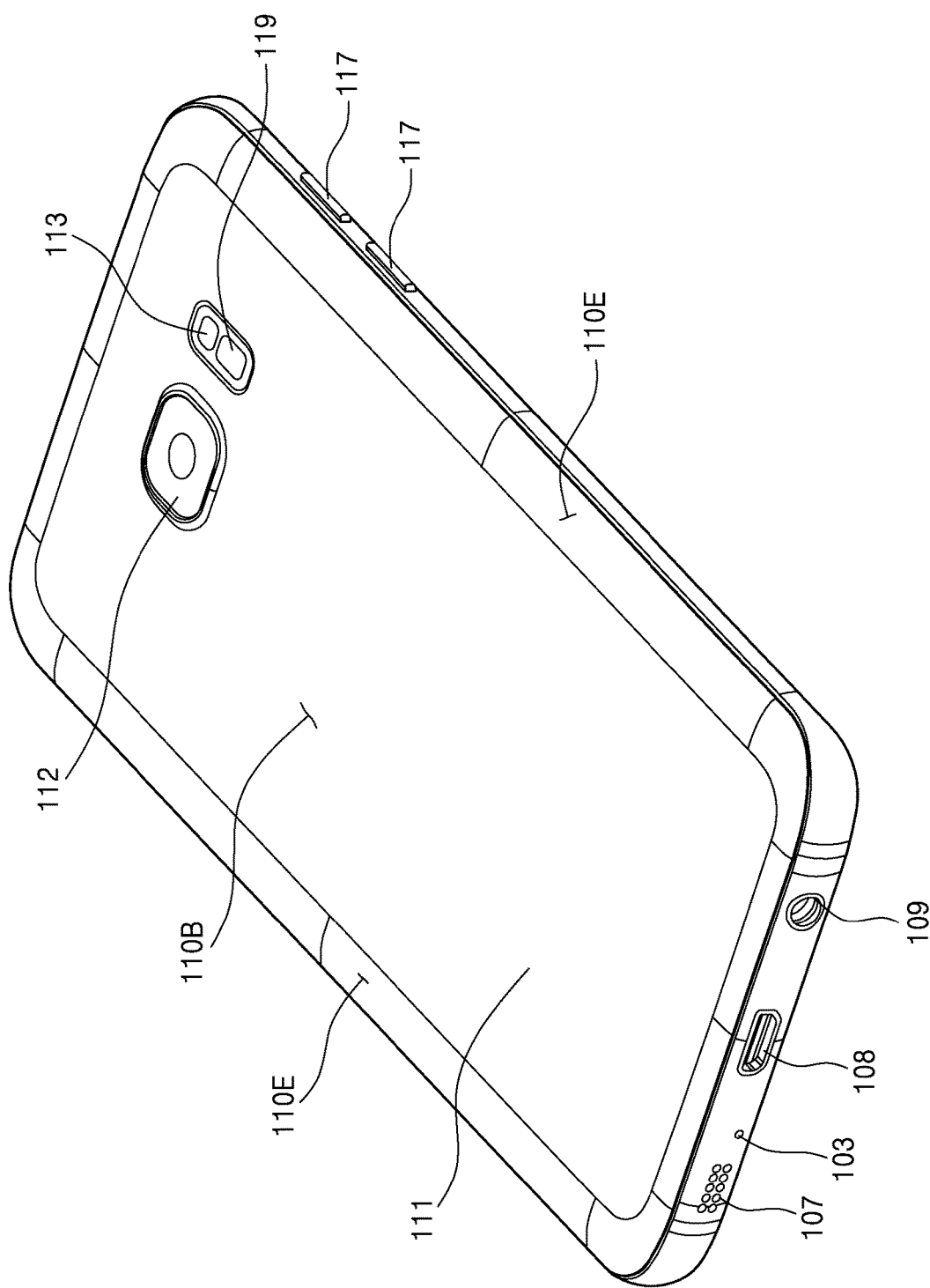
FIG. 2 is a perspective view of a rear surface of the electronic device of FIG. 1.

FIG. 1 is a perspective view of a front surface of an electronic device 100, according to an embodiment, and FIG. 2 is a perspective view of a rear surface of the electronic device 100 of FIG. 1.

Referring to FIGS. 1 and 2, the electronic device 100 according to an embodiment may include a housing 110 including a first surface 110A (a front surface), a second surface 110B (a rear surface), and a side surface 110C surrounding a space between the first and second surfaces 110A and 110B. According to another embodiment, the housing 110 may denote a structure forming a part of the first surface 110A, the second surface 110B, and the side surface 110C. According to an embodiment, the first surface 110A may be formed by a front plate 102 that is substantially at least partially transparent, such as a glass plate including various coating layers, or a polymer plate. The second surface 110B may be formed by a rear plate 111 that is substantially opaque. The rear plate 111 may be formed of coated or tinted glass, ceramic, polymer, a metal (for example, aluminum (Al), stainless steel (STS), or magnesium (Mg)), or a combination of at least two thereof. The side surface 110C may combine with the front plate 102 and the rear plate 111, and may be formed by a side bezel structure 118 (a side member) including a metal and/or polymer. According to an embodiment, the rear plate 111 and the side bezel structure 118 may be integrally formed and may include the same material, for example, a metal such as Al.

In FIG. 1, the front plate 102 may include, at two long edges of the front plate 102, a first region 110D seamlessly extending from the first surface 110A while being bent towards the rear plate 111. In FIG. 2, the rear plate 111 may include, at two long edges of the rear plate 111, a second region 110E seamlessly extending from the second surface 110B while being bent towards the front plate 102. In some embodiments, the front plate 102 or the rear plate 111 may include only one of the first and second regions 110D and 110E. In the above embodiments, in terms of the electronic device 100, the size bezel structure 118 may have a first thickness (or width) at a side that does not include the first or second region 110D or 110E, and may have a second thickness thinner than the first thickness at a side that includes the first or second region 110D or 110E.

According to an embodiment, the electronic device 100 may include at least one of a display 101, audio modules, sensor modules, camera modules, key input devices, an indicator 106, and connector holes. According to another embodiment, the electronic device 100 may omit at least one of the above components (for example, the key input devices or the indicator 106), or may additionally include another component.

The display 101 may be exposed through, for example, most part of the front plate 102. In some embodiments, at least a part of the display 101 may be exposed through the front plate 102 forming the first surface 110A and the first region 110D of the side surface 110C. The display 101 may be combined to or disposed adjacent to a touch detecting circuit, a pressure sensor measuring touch intensity (pressure), and/or a magnetic stylus pen. In some embodiments, at least some of the sensor modules and/or at least some of the key input devices may be disposed in the first region 110D and/or the second region 110E.

The audio modules may include a microphone hole 103 and speaker holes. The microphone hole 103 may include a microphone therein to obtain external sound, and in some embodiments, may include a plurality of microphones to detect a direction of sound. The speaker holes may include an external speaker hole 107 and a call receiver hole 114. In some embodiments, the speaker holes and the microphone hole 103 may be embodied in one hole, or the electronic device 100 may include a speaker (for example, a piezo-speaker) without the speaker holes.

The sensor modules may generate an electronic signal or data value corresponding to an operating state inside or an environmental state outside the electronic device 100. The sensor modules may include, for example, a first sensor module 104 (for example, a proximity sensor) and/or a second sensor module (not shown) (for example, a fingerprint sensor) disposed on the first surface 110A of the housing 110 and/or a third sensor module 119 (for example, a hear rate monitor (HRM) sensor) disposed on the second surface 110B of the housing 110. The fingerprint sensor may be disposed not only on the first surface 110A (for example, on a home key button 115) of the housing 110, but also on the second surface 110B. The electronic device 100 may further include another sensor module that is not illustrated, for example, at least one of a gesture sensor, a gyro sensor, an atmospheric sensor, a pressure sensor, a magnetic sensor, an acceleration sensor or accelerometer, a grip sensor, a color sensor, an infrared (IR) sensor, a biometric sensor, a temperature sensor, a humidity sensor, and an illumination sensor.

The camera modules may include a first camera device 105 disposed on the first surface 110A of the electronic device 100, a second camera device 112 disposed on the second surface 110B, and/or a flash 113. The first and second camera devices 105 and 112 may include one or more lenses, an image sensor, and/or an image signal processor. The flash 113 may include, for example, a light-emitting diode or a xenon lamp. In some embodiments, at least two lenses (a wide-angle lens and a telephoto lens) and image sensors may be disposed on one surface of the electronic device 100.

The key input devices may include the home key button 115 disposed on the first surface 110A of the housing 110, a touch pad 116 disposed around the home key button 115, and/or a side key button 117 disposed on the side surface 110C of the housing 110. According to another embodiment, the electronic device 100 may not include some or all of the above key input devices, and the key input devices that are not included may be embodied in another form, such as a soft key, on the display 101.

The indicator 106 may be disposed on, for example, the first surface 110A of the housing 110. The indicator 106 may provide, for example, state information of the electronic device 100 in a light form, and may include a light-emitting device.

The connector holes may include a first connector hole 108 capable of accommodating a connector (for example, a universal serial bus (USB) connector) for transmitting or receiving power and/or data, and/or a second connector hole 109 (of an earphone jack) for accommodating a connector for transmitting or receiving an audio signal to or from an external electronic device.

Figure 3:
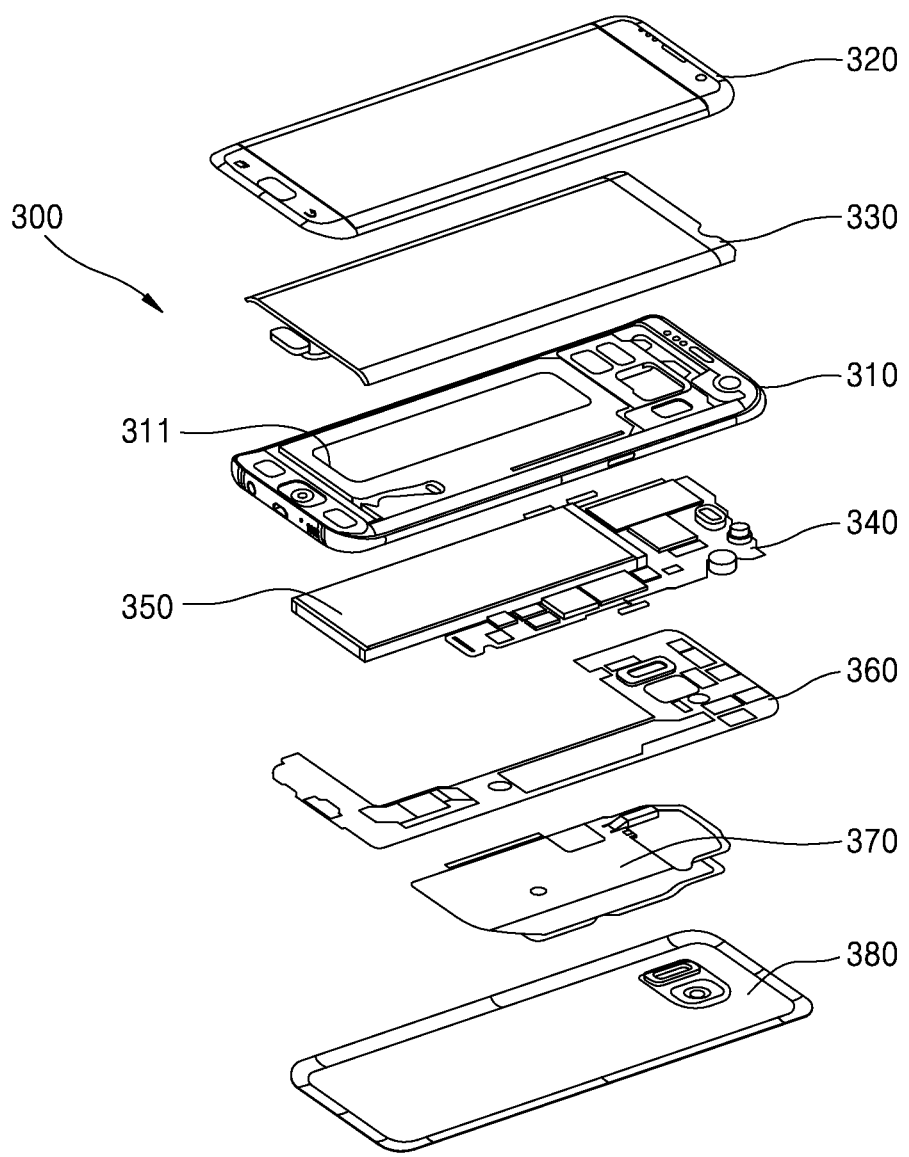
FIG. 3 is an exploded perspective view of the electronic device of FIG. 1.

FIG. 3 is an exploded perspective view of an electronic device 300.

Referring to FIG. 3, the electronic device 300 may include a size bezel structure 310, a first support member 311 (for example, a bracket), a front plate 320, a display 330, a printed circuit board (PCB) 340, a battery 350, a second support member 360 (for example, a rear case), an antenna 370, and a rear plate 380. In some embodiments, the electronic device 300 may omit at least one of the above components (for example, the first or second support member 311 or 360), or may further include another component. At least one of the components of the electronic device 300 may be the same or similar to that of the components of the electronic device 100 of FIG. 1 or 2, and redundant descriptions are omitted here.

The first support member 311 may be connected to the size bezel structure 310 by being disposed in the electronic device 300, or may be integrated with the size bezel structure 310. The first support member 311 may be formed of, for example, a metal material and/or a non-metal material (for example, polymer). The first support member 311 may have one surface connected to the display 330 and the other surface connected to the PCB 340. A processor, a memory, and/or an interface may be mounted on the PCB 340. The processor may include, for example, at least one of a central processing unit (CPU), an application processor, a graphic processing unit (GPU), an image signal processor, a sensor hub processor, and a communication processor. The CPU may be a multi-core processor.

The memory may include, for example, a volatile memory and/or a non-volatile memory.

The interface may include, for example, a high-definition multimedia interface (HDMI), a USB interface, a secure digital (SD) card interface, and/or an audio interface. The interface may electrically and/or physically connect the electronic device 300 to an external electronic device, and may include a USB connector, an SD card/multimedia card (MMC) connector, or an audio connector.

The battery 350 is a device for supplying power to at least one component of the electronic device 300, and for example, may include a non-rechargeable primary battery, a rechargeable secondary battery, or a fuel cell. At least a part of the battery 350 may be disposed substantially on the same plane as the PCB 340. The battery 350 may be integrally or detachably disposed in the electronic device 100.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may communicate with an external device via NFC, or may wirelessly transmit or receive power required for charging. According to another embodiment, an antenna structure may be formed by some of the size bezel structure 310 and/or the first support member 311 or a combination thereof.

Figure 4:
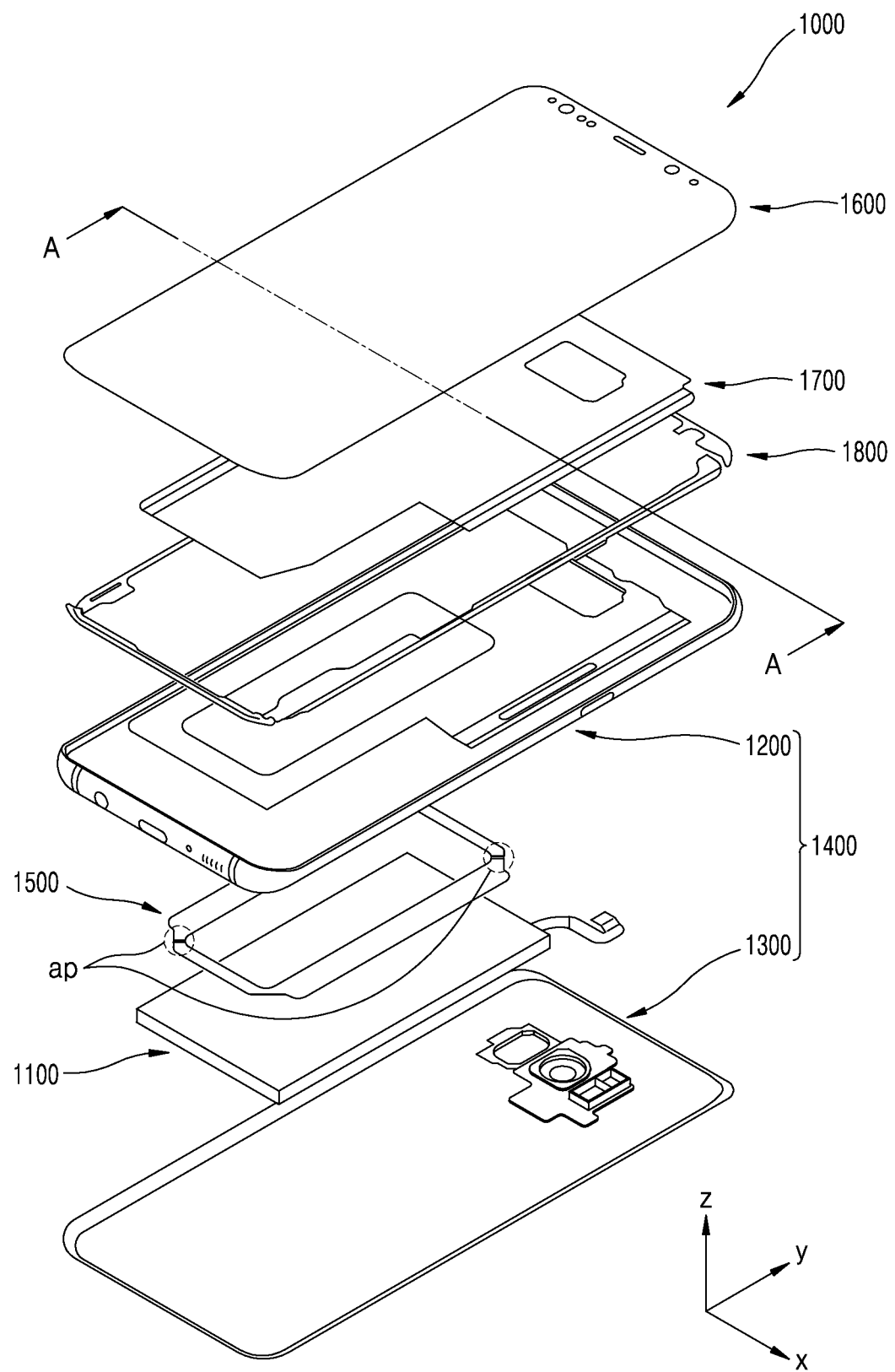
FIG. 4 is an exploded perspective view of a structure of an electronic device, according to an embodiment.
Figure 5:
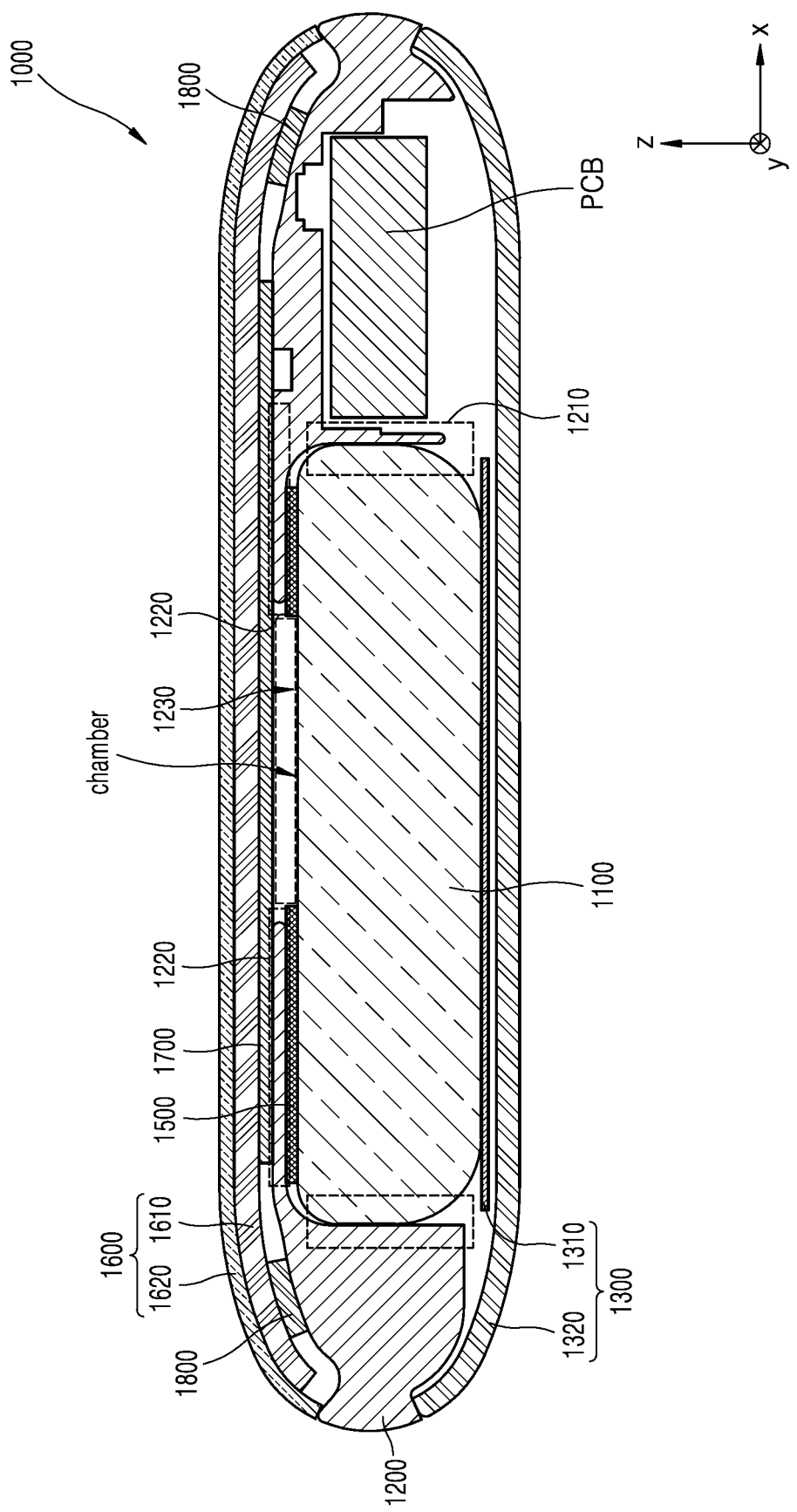
FIG. 5 is a cross-sectional view taken along a line A-A' of FIG. 4.

FIG. 4 is an exploded perspective view of a structure of an electronic device 1000, according to an embodiment, and FIG. 5 is a cross-sectional view taken along a line A-A' of FIG. 4 (or FIG. 1).

Referring to FIGS. 4 and 5, the electronic device 1000 includes a battery 1100, a housing 1400 including a frame 1200 and a rear part 1300, a battery tape 1500, a display module 1600, and a display tape 1700.

The battery 1100 is a member that supplies power to the electronic device 1000. The battery 1100 may have a front surface and a rear surface that face each other, and a side surface connecting the front and rear surfaces. The battery 1100 may be mounted in the housing 1400. At least a portion of the battery 1100 may be exposed in order to accommodate a swelling phenomenon of the battery 1100. For example, the electronic device 1000 may include a chamber, i.e., an empty space adjacent to at least a portion of the battery 1100. Also, at least a part of the housing 1400 may be penetrated such that the chamber is formed.

The housing 1400 may form at least a part of an outer appearance of the electronic device 1000. The housing 1400 may provide an integrated space for each component of the electronic device 1000 to be accommodated. The housing 1400 includes the frame 1200 and the rear part 1300. The housing 1400 has an integrated structure for protecting the electronic device 1000 from external force and accommodating electronic components.

At least a portion of a front surface of the frame 1200 is connected to the display module 1600. For example, the display tape 1700 may be provided between the front surface of the frame 1200 and the display module 1600 to connect the frame 1200 and the display module 1600. At least a portion of a rear surface of the frame 1200 is connected to the rear part 1300.

The frame 1200 provides a space, in which various electronic components required in the electronic device 1000, such as the audio modules, the sensor modules, the camera modules, the key input devices, the indicator 106, the connector holes of FIG. 1, and a PCB, are disposed. For example, the frame 1200 may have a plate-shaped structure, and include an opening 1230 penetrating the front and rear surfaces of the frame 1200.

The frame 1200 includes a battery mounting structure 1250 (FIG. 6B) that mounts the battery 1100. The battery mounting structure 1250 includes a battery rib 1210 formed along a side surface of the battery 1100 such that the battery 1100 is accommodated, and a battery mounting plate 1220 forming the opening 1230 that exposes at least a part of a front surface of the battery 1100. The area of the opening 1230 may be smaller than the area of the front surface of the battery 1100. In this case, a portion of the front surface of the battery 1100 is connected to the battery mounting plate 1220, and the remaining portion of the front surface of the battery 1100 is exposed through the opening 1230, and thus the battery 1100 may swell and expand into the opening 1230. The battery mounting plate 1220 provides an area to be connected to the remaining portion of the front surface of the battery 1100. For example, the battery mounting plate 1220 may be connected to the battery 1100 through the battery tape 1500.

The rear part 1300 is connected to a rear surface of the frame 1200. The rear part 1300 may include a rear cover 1310 that supports the rear surface of the battery 1100 and prevents damage caused by an external force or material, and rear glass 1320 provided at a rear surface of the rear cover 1310. The rear part 1300 may have an integral shape and structure combined to the rear surface of the frame 1200 and supporting the battery 1100, and is not limited to above embodiments.

The rear cover 1310 may include an antenna cover covering, for example, the antenna 370 of FIG. 3, an NFC quick charger cover (not shown), and a speaker cover (not shown).

The rear glass 1320 may be formed of any one of glass, acryl, and transparent plastic, but is not limited thereto.

The battery tape 1500 is provided between the battery 1100 and the battery mounting plate 1220, and adheres the battery 1100 to the battery mounting plate 1220. The battery tape 1500 may have a shock-absorbing function, and prevent the battery 1100 from being damaged due to external force. The battery tape 1500 may have a loop shape having an inner surface and an outer surface such that the front surface of the battery 1100 exposed through the opening 1230 is not covered. Shapes and arrangements of the battery tape 1500 will be described below with reference to FIGS. 7A through 9H. The battery tape 1500 may be, for example, a double-sided adhesive tape.

The display module 1600 includes a display panel 1610 displaying an image, and front glass 1620 protecting the display panel 1610 from an external impact.

The display panel 1610 may be formed of a flexible material. For example, the display panel 1610 may be formed of polyimide (PI). The display panel 1610 may include an organic light-emitting diode (OLED) or a liquid crystal display (LCD). The display panel 1610 may be provided at a rear surface of the front glass 1620. The display panel 1610 may contact at least a portion of the front surface of the frame 1200.

The front glass 1620 may be a bent type having a curved surface. The front glass 1620 may be formed of a rigid material, such as polycarbonate, but is not limited thereto, and may be formed of a flexible material. For example, the front glass 1620 may be formed of PI. For example, when the front glass 1620 is bent type glass, the display panel 1610 may have a curved shape according to the shape of the front glass 1620. The front glass 1620 may be formed of one of glass, acryl, sapphire glass, ceramic, and transparent plastic, but is not limited thereto.

The display module 1600 may include not only the display panel 1610, but also an additional layer having various functions. For example, the display module 1600 may further include a touch screen panel (not shown) provided at a front or rear surface of the display panel 1610 and receiving a touch input or signal. Also, the display module 1600 may further include a PCB. For example, the display module 1600 may further include an electromagnetic induction panel (for example, a digitizer). The electromagnetic induction panel may generate an input signal through an electromagnetic induction phenomenon with an electromagnetic induction pen or stylus. Such an electromagnetic induction panel may be provided below the display panel 1610, but is not limited thereto. For example, the display module 1600 may further include a heat-dissipating sheet. The heat-dissipating sheet may be formed of a 2-dimensional (2D) material, for example, graphite or a metal such as copper. The heat-dissipating sheet may be provided below the electromagnetic induction panel or the display panel 1610 to prevent heat generated by the display panel 1610 from being transmitted to another electronic component. Also, the display module 1600 may further include a polarizing sheet. The polarizing sheet may change a polarization component of light formed in the display panel 1610. Also, the display module 1600 may include an electromagnetic shielding sheet for shielding electromagnetic noise. The electromagnetic shielding sheet may be formed of a metal, such as copper.

The display module 1600 may further include an additional adhesive sheet that adheres the display panel 1610, the polarizing sheet, the heat-dissipating sheet, the touch panel, the electromagnetic induction panel, and the electromagnetic shielding sheet to each other. For example, the touch panel, the polarizing sheet, and the display panel 1610 may be sequentially adhered. For example, the touch panel and the polarizing sheet may be adhered to each other by a first adhesive layer. For example, the polarizing sheet and the display panel 1610 may be adhered to each other by a second adhesive layer.

The display panel 1610 may be provided between the display module 1600 and the frame 1200 to combine the display module 1600 and the frame 1200 to each other. The display tape 1700 may be provided between at least a part of the rear surface of the display panel 1610 and at least a part of the front surface of the frame 1200. For example, a region where the display tape 1700 is prepared may be more inside than a region where the front glass 1620 contacts the front surface of the frame 1200 (inside based on the electronic device 1000). The region where the display tape 1700 is prepared may be a region where an electronic component (for example, a PCB) related to the display panel 1610 is not prepared.

The display tape 1700 may have a shock-absorbing function, and protect the display panel 1610 from external force. The display tape 1700 may be, for example, a double-sided adhesive tape. The display tape 1700 may be removable.

The display tape 1700 may have a planar shape. The display tape 1700 may have an opening that vertically corresponds to (i.e., overlays) the opening 1230 exposing at least a part of the front surface of the battery 1100, wherein the opening may be an open type or a closed type. The electronic device 1000 may further include a waterproof tape 1800. The waterproof type 1800 may be provided between the display module 1600 and the frame 1200, and prevent external moisture from penetrating into the electronic device 1000. The waterproof tape 1800 may be provided in an outer region than the display tape 1700 (outside based on the electronic device 1000).

The electronic device 1000 according to an embodiment may include at least one air path "ap" for preventing formation of an airtight chamber. In some embodiments, there may be multiple air paths. Referring to FIGS. 4 and 5, a chamber may be formed by the front surface of the battery 1100, the battery tape 1500, the frame 1200, the display tape 1700, and the rear surface of the display module 1600. For example, the display module 1600 and/or the display tape 1700 may form an upper cover of the chamber. For example, the front surface of the battery 1100 may form a lower cover of the chamber. For example, an inner surface of the battery tape 1500, an inner surface of the battery mounting plate 1220, and/or an inner surface of the display tape 1700 may form a side surface of the chamber. In order to form the chamber, the battery tape 1500, the battery mounting plate 1220, and the display tape 1700 may each include at least one opening penetrating the rear and front surfaces thereof. Locations of the openings of the battery tape 1500, battery mounting plate 1220, and display tape 1700 may vertically correspond to each other.

As described above, at least a part of the front surface of the battery 1100 is exposed through the opening (an opening 1530 of FIG. 7A) of the battery tape 1500 and the opening 1230 of the battery mounting plate 1220 considering swelling. Such an exposed surface of the battery 1100 may contact a chamber, i.e., the empty space blocked and formed by the display tape 1700 or the display module 1600. When the chamber forms an airtight chamber, the chamber may directly or indirectly affect the display module 1600 due to air expansion and contraction based on a temperature change of the battery 1100 or a difference of air pressure inside and outside the chamber due to the expansion of the waterproof tape 1800 after its aging time. For example, the display panel 1610 formed of a flexible material may be deformed due to air expansion or pressure of an airtight chamber, and thus display quality may deteriorate. In this regard, the electronic device 1000 according to an embodiment prevents formation of an airtight chamber through an air path communicating a chamber and external air (i.e., atmospheric air). Such an electronic device 1000 may prevent thermal expansion of air in the chamber and prevent deformation of the display panel 1610 by venting air to the outside of the device and prevent the deformation of the display panel 1610 by circulating air from outside to the chamber.

The air path ap may be provided in at least one of the battery 1100, the housing 1400, the battery tape 1500, the display module 1600, and the display tape 1700. For example, the air path ap may have an aperture or groove shape. For example, the air path ap may extend in an external direction from the chamber. For example, one or more air paths ap may be provided in each component, but the number of the air paths ap is not limited thereto. The width of the air path ap may be from 0.3 mm to 3 mm, but is not limited thereto. For example, the width of the air path ap may be from 0.5 mm to 1.5 mm. The width of the air path ap may vary based on the size and shape of the chamber, and a physical characteristic of a component where the air path ap is provided.

The air path ap may connect the chamber contacting at least a part of the battery 1100 to another space in the electronic device 1000. The other space may be any integrated space provided in the electronic device 1000 and circulating air. For example, the other space may be any integrated internal space naturally generated with respect to a combination the components of the electronic device 1000, such as a space between the display module 1600 and the frame 1200, a space between the battery 1100 and the frame 1200, or a space between the frame 1200 and the rear part 1300.

FIGS. 6A and 6B are respectively a front plan view and a rear plan view of the frame 1200, according to an embodiment. Referring to FIGS. 6A and 6B, the frame 1200 includes the battery mounting structure 1250.

The battery mounting structure 1250 includes the battery rib 1210 formed along the side of the battery 1100 so as to support the battery 1100. The battery rib 1210 may have a fence shape matching the shape of the side of the battery 1100. For example, when the side of the battery 1100 has n corners, wherein n is an arbitrary natural number, the battery rib 1210 may also have n corners. In FIG. 6B, the battery rib 1210 has four corners.

The battery mounting structure 1250 includes the battery mounting plate 1220 forming the opening 1230 that exposes at least a part of the front surface of the battery 1100. The battery mounting plate 1220 is formed in a horizontal direction (an x-y plane) from the battery rib 1210, and includes the opening 1230 that is opened at the center. The battery tape 1500 may be attached along the circumference of the opening 1230 of the battery mounting plate 1220. For example, the opening 1530 of FIG. 4 of the battery tape 1500 may have the same shape and size as the opening 1230, but is not limited thereto. The battery tape 1500 may include, for example, the air path ap at a corner region. The air path ap connects the chamber and an external area such that air is circulated.

Figure 7A:
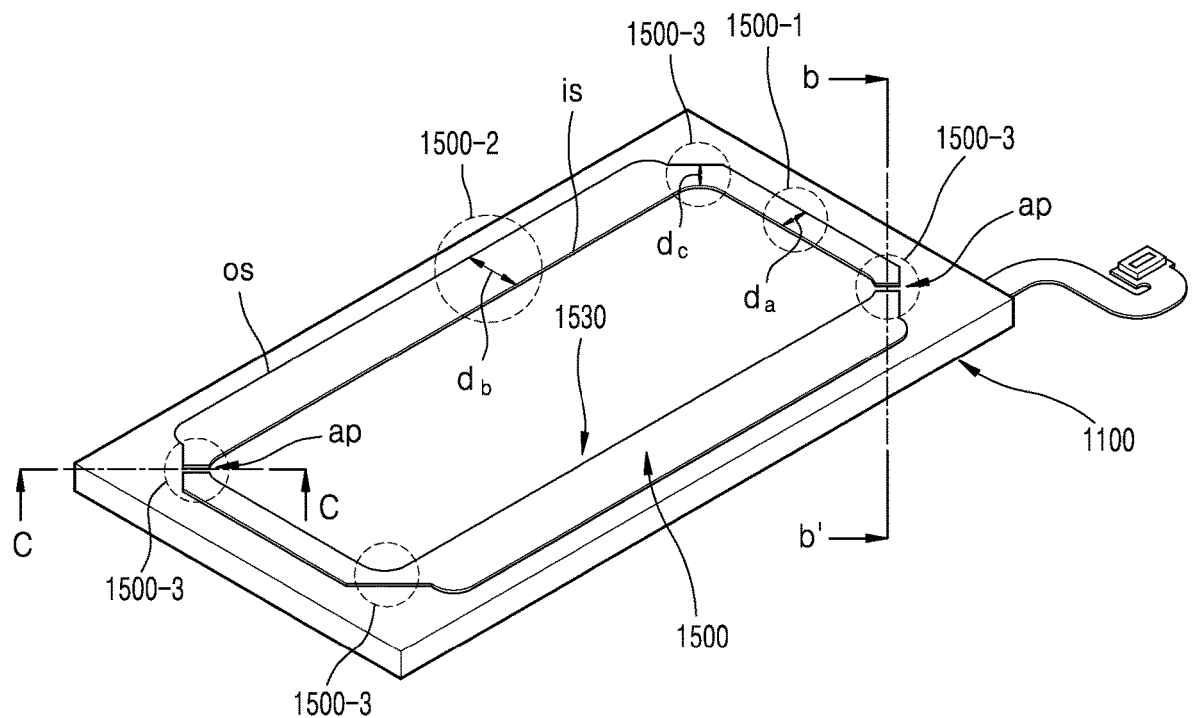
FIGS. 7A and 7B are respectively a perspective view and a cross-sectional view of a battery tape attached to a front surface of a battery, according to an embodiment.
Figure 7B:
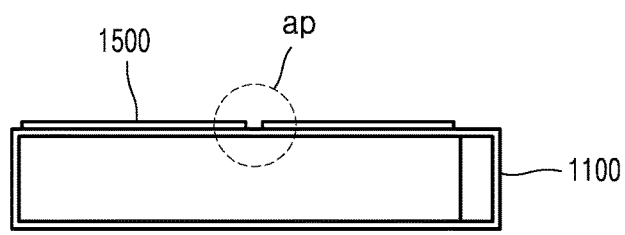

FIGS. 7A and 7B are respectively a perspective view and a cross-sectional view of the battery tape 1500 attached to the front surface of the battery 1100, according to an embodiment.

Referring to FIGS. 7A and 7B, the battery tape 1500 is provided on the front surface of the battery 1100. The battery tape 1500 may have a closed loop shape including an inner surface is and an outer surface os. The battery tape 1500 may include the opening 1530. The opening 1530 of the battery tape 1500 may be located at a region perpendicularly corresponding to the opening 1230 of the frame 1200. For example, the opening 1530 of the battery tape 1500 may have the same shape and size as the opening 1230 of the frame 1200, and may overlay the opening 1230.

The shape of the battery tape 1500 may be determined based on the shape of the battery 1100. For example, when the shape of the front surface of the battery 1100 is rectangular, the shape of the battery tape 1500 may have a closed loop rectangular shape having four corners.

Widths of the battery tape 1500 in a horizontal direction may be even or uneven, wherein the widths are shortest distances from the inner surface is to the outer surface os. For example, widths $d_c$ at a plurality of corner regions, a widthwise width $d_b$, and a lengthwise width $d_a$ may be the same or different from each other. For example, referring to FIG. 7A, the widths $d_c$ may be smaller than the widthwise width $d_b$ and the lengthwise width $d_a$. The air path ap may be provided at a region having a small width by priority, but is not limited thereto. When the air path ap is provided at a region of the battery tape 1500 having a small width, air may easily circulate between the chamber and the outer region. For example, as shown in FIG. 7A, the air path ap may be provided in at least one of a plurality of corner regions 1500-3 or lengthwise region 1500-1 or widthwise region 1500-2. Also, the battery tape 1500 may have strong adhesive strength, and may be easily adhered to the front surface of the battery.

When there are a plurality of the air paths ap, the air paths ap may face each other across the opening 1530 of the battery tape 1500. For example, when the air path ap is provided at the corner 1500-3 at the right top, the other air path ap may be provided at the corner 1500-3 at the left bottom. By forming such a symmetric structure, the air may be smoothly circulated between the chamber and the external area.

Figure 8:
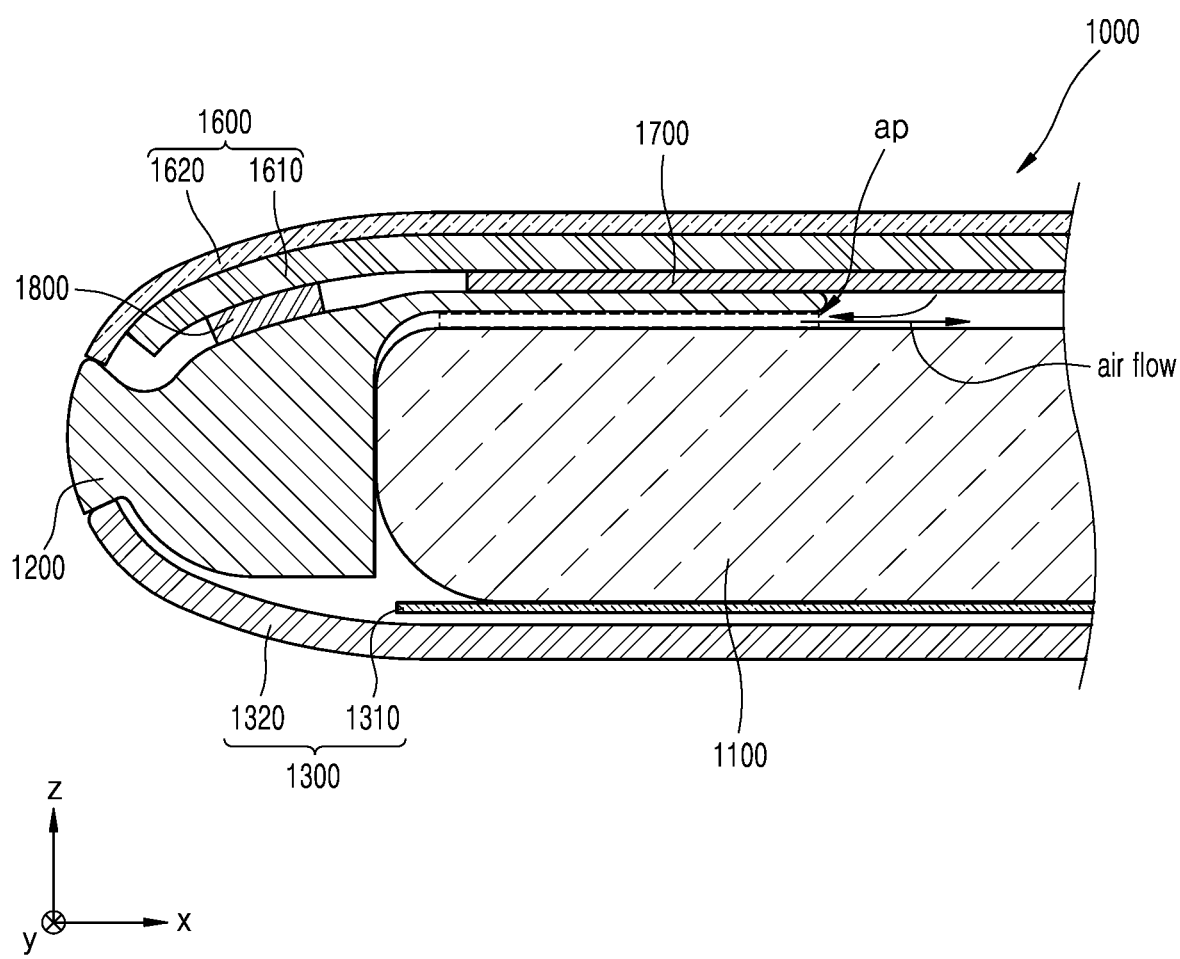
FIG. 8 is a cross-sectional view taken along a line C-C' of FIG. 7A.

FIG. 8 is a cross-sectional view taken along a line C-C' of FIG. 7A. Descriptions about components of FIG. 8, which correspond to those of FIG. 5, are not provided here for the sake of brevity.

Referring to FIG. 8, the chamber and the external area are connected to each other through the air path ap formed in the battery tape 1500, wherein the air circulates through the air path ap. The width of the air path ap may be from 0.3 mm to 3 mm, but is not limited thereto. In FIG. 8, the battery 1100 is completely adhered to the frame 1200, but there may be a gap (not shown) between the battery 1100 and the frame 1200 for air circulation. For example, air in a space at the front surface of the battery 1100 may circulate to a space between the rear part 1300 and the housing 1400 through a clearance space of the frame 1200 and battery 1100. Accordingly, the deformation of the display module 1600 is prevented and a space that permits swelling/expansion of the battery 1100 is not airtight.

FIGS. 9A through 9H are diagrams showing battery tapes 1500-a through 1500-h and locations of air paths, according to embodiments. Although several examples are described below, the air path may be disposed on other parts of the battery tape. Also, the battery tape may include combinations of the air paths described below. For example, there may be multiple air paths.

The corner type battery tape 1500-a may include an air path at one of corner regions.

The top type battery tape 1500-b may include an air path at one point of a top side.

The bottom type battery tape 1500-c may include an air path at one point of a bottom side.

The left type battery tape 1500-d may include an air path at one point of a left side.

The right type battery tape 1500-e may include an air path at one point of a right side.

The corner double type battery tape 1500-f may include air paths in two facing corner regions for smooth air circulation.

The top-bottom type battery tape 1500-g may include air paths at top and bottom sides to face each other.

The left-right type battery tape 1500-h may include air paths at left and right sides to face each other.

Figure 10:
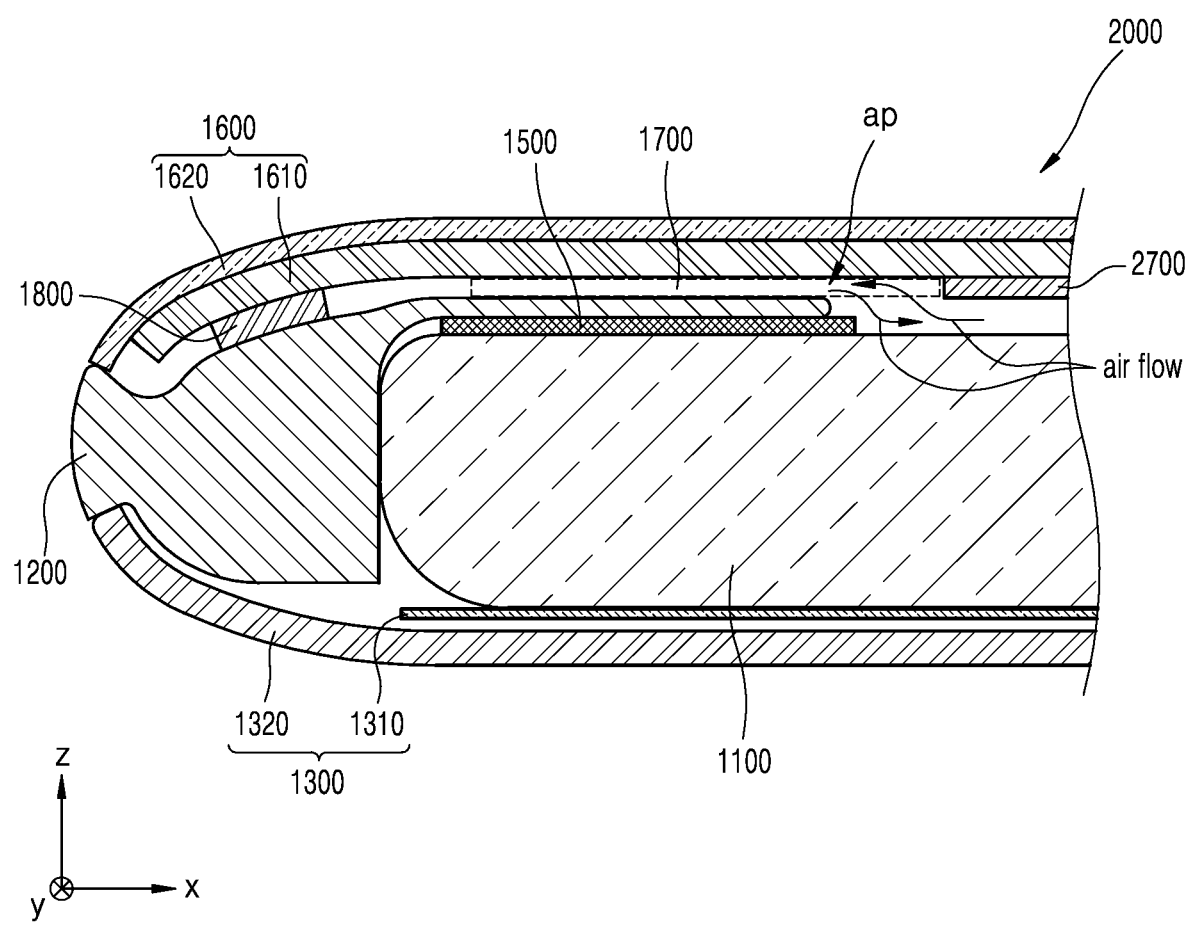
FIG. 10 is a cross-sectional view of an electronic device according to an embodiment, wherein an air path is provided at a display tape.
Figure 11B:
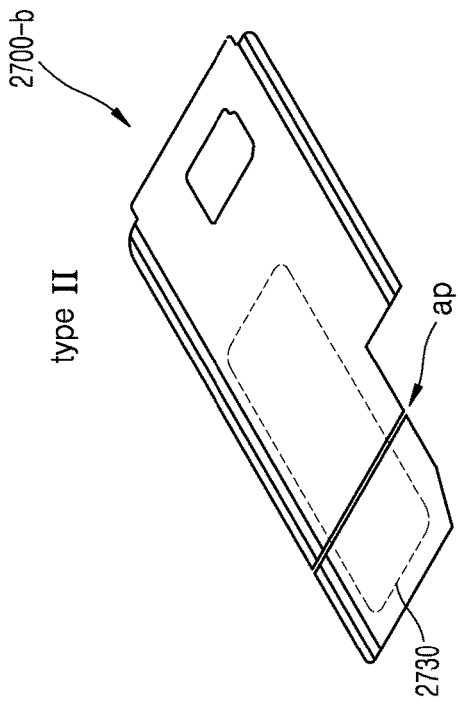
FIGS. 11A through 11D are diagrams showing display tapes and locations of air paths, according to embodiments.
Figure 11D:
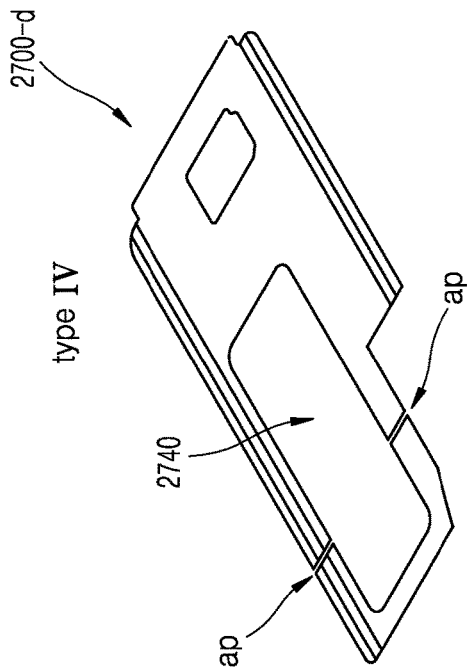
Figure 11A:
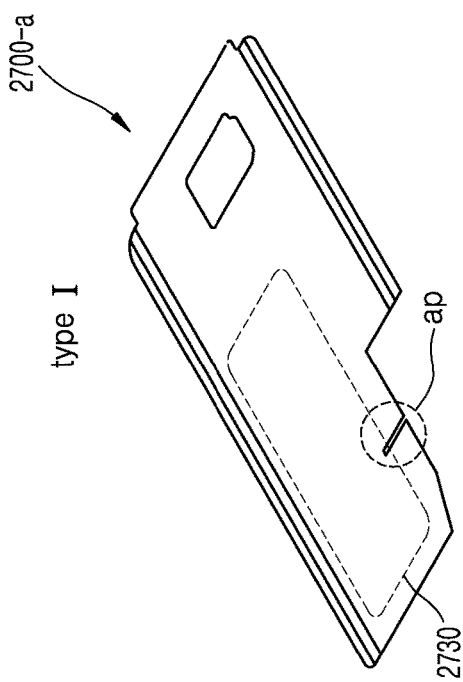
Figure 11C:
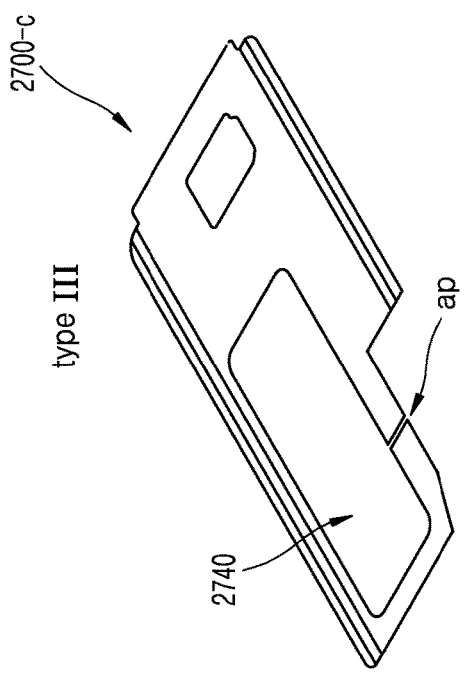

FIG. 10 is a cross-sectional view of an electronic device 2000 according to an embodiment, wherein the air path ap is provided at a display tape 2700. FIGS. 11A through 11D are diagrams showing display tapes 2700-a through 2700-d and locations of air paths ap, according to embodiments.

Components of the electronic device 2000 other than the display tape 2700 are same as those described above with reference to FIG. 5, and thus descriptions thereof are not provided here.

Referring to FIG. 10, in the electronic device 2000 according to an embodiment, the air path ap is formed on the display tape 2700. The air of the chamber may be circulated to the external area through the air path ap. The width of the air path ap may be set to 0.3 mm to 3 mm, but is not limited thereto. The air in a space in front of the battery 1100 may be circulated to the space between the display module 1600 and the housing through the air path ap formed on the display tape 2700. Accordingly, deformation of the display module 1600 is prevented and a space that permits swelling/expansion of the battery 1100 is not airtight.

Referring to FIGS. 11A through 11D, the display tape 2700 may include at least one of a first closed type display tape 2700-a, a second closed type display tape 2700-b, a first open type display tape 2700-c, and a second open type display tape 2700-d.

The first and second closed type display tapes 2700-a and 2700-b may include an opening corresponding region 2730 having a closed shape in which air is not circulated. In this case, the opening corresponding regions 2730 of the first and second closed type display tapes 2700-a and 2700-b may form a top cover of the chamber.

The opening corresponding region 2730 may be region having the same shape and size as the opening 1230 of the frame 1200. For example, the opening corresponding region 2730 may be located to correspond to the opening 1230 of the housing 1400 based on a vertical direction. In other words, the opening corresponding region 2730 may overlay the opening 1230.

The first closed type display tape 2700-a may include the air path ap connected to the external area from a certain point of the opening corresponding region 2730. Here, the certain point may be an arbitrary point inside or boundary of the opening corresponding region 2730, and is not limited. In this case, the air of the chamber may circulate to the external area through the air path ap.

The second closed type display tape 2700-b may include the air path ap penetrating the opening corresponding region 2730 in a lateral direction. For example, the air path ap may penetrate the opening corresponding region 2730 at a shortest distance, but is not limited thereto.

The first and second open type display tapes 2700-c and 2700-d may include the opening corresponding region 2730 having an opening 2740 where air is circulated. In this case, the top cover of the chamber may be formed by the display panel 1610. For example, the openings 2740 of the first and second open type display tapes 2700-c and 2700-d may have the same shape and size as the opening 1230 of the frame 1200. For example, the opening 2740 may be located to correspond to the opening 1230 of the housing 1400 in a vertical direction.

The first open type display tape 2700-c may include the air path ap connected to the external area from the end of the opening 2740. In this case, the air of the chamber may circulate to the external area through the air path ap.

The second open type display tape 2700-d may include the air path ap penetrating the opening 2740 in a lateral direction. For example, the air path ap may penetrate the opening 2740 at a shortest distance, but is not limited thereto.

Figure 12:
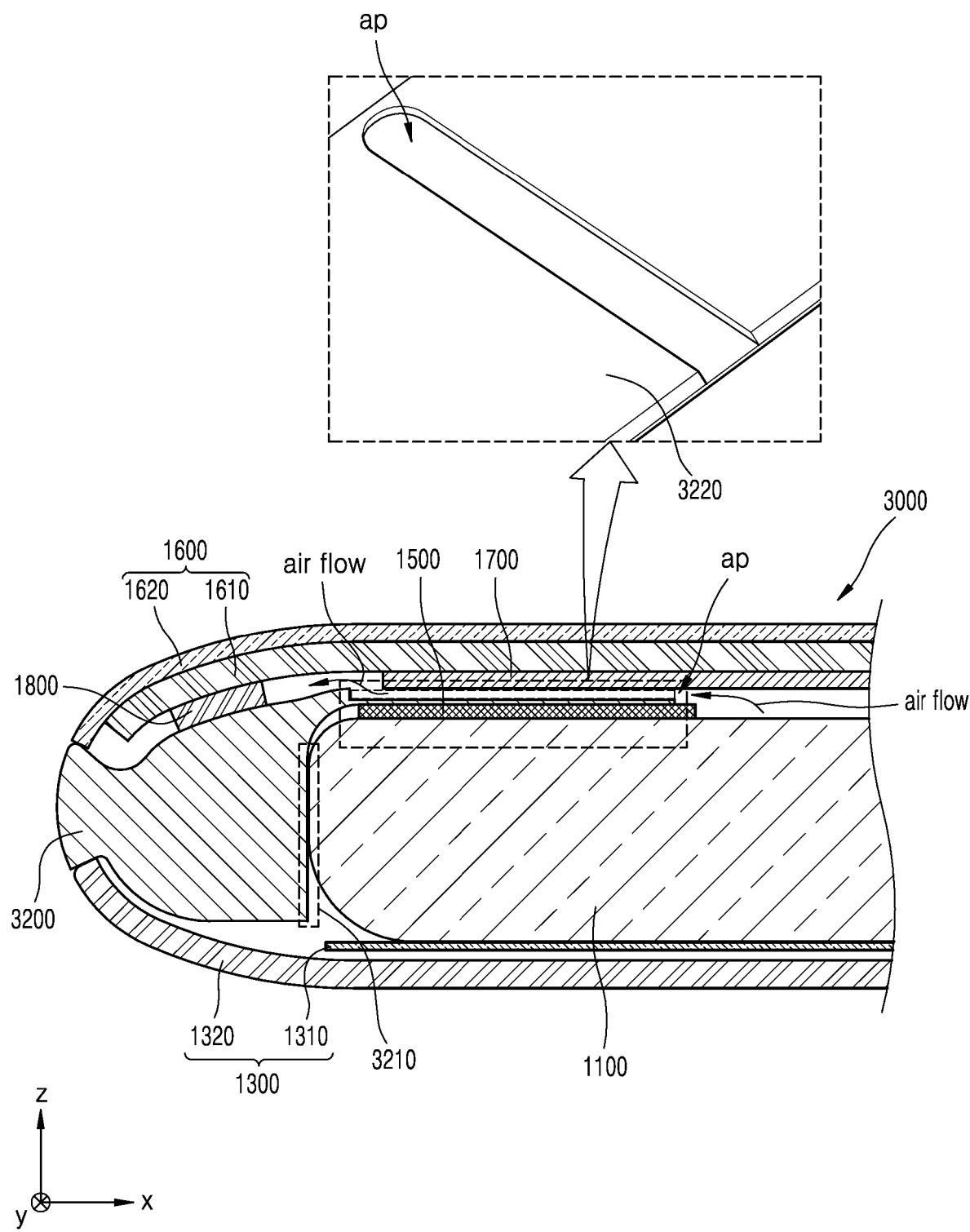
FIG. 12 is a cross-sectional view of an electronic device according to an embodiment, in which an air path is provided at a front surface of a battery mounting plate, and a perspective view of a structure of an air path.
Figure 13A:
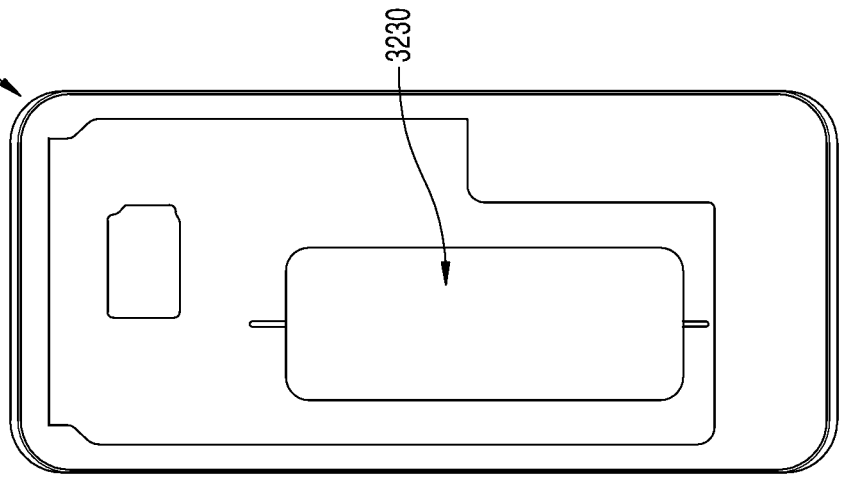
FIGS. 13A through 13C are diagrams showing front surfaces of frames and locations of air paths, according to embodiments.
Figure 13B:
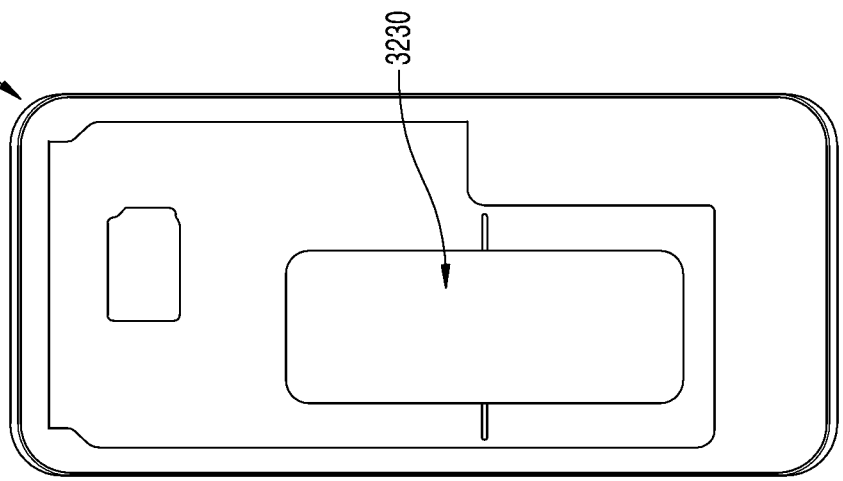
Figure 13C:
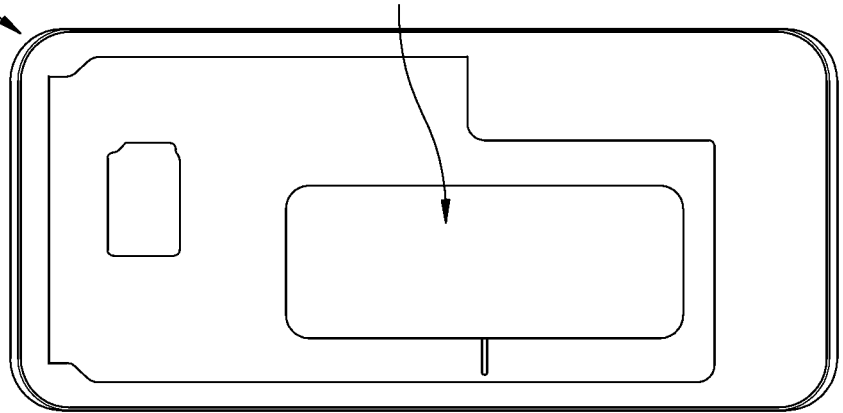

FIG. 12 is a cross-sectional view of an electronic device 3000 according to an embodiment, in which the air path ap is provided at a front surface of a battery mounting plate 3220, and a perspective view of a structure of the air path ap. FIGS. 13A through 13C are diagrams showing front surfaces of frames 3200-a through 3200-c and locations of air paths, according to embodiments.

Components of the electronic device 3000 other than a frame 3200 are same as those described above with reference to FIG. 5, and thus descriptions thereof are not provided here for the sake of brevity.

Referring to the perspective view of FIG. 12, the air path ap may be formed on a front surface of the battery mounting plate 3220 in an aperture or groove shape. The width of the air path ap may be set to 0.3 mm to 3 mm, but is not limited thereto. For example, the width of the air path ap may be 0.5 mm to 1.5 mm.

The air path ap may extend from an opening 3230 towards a battery rib 3210. The air path ap may extend sufficiently up to a point for contacting the external area, and such a point may be located between the battery rib 3210 and the opening 3230. The thickness of the air path ap in a vertical direction may be set at a certain region such that the battery mounting plate 3220 maintains sufficient rigidity to support the battery 1100, and air is sufficiently circulated.

Referring to FIGS. 13A through 13C, the frame 3200 may include any one of a single type frame 3200-*a*, a left-right type frame 3200-*b*, and a top-bottom type frame 3200-*c*, but is not limited thereto.

The single type frame 3200-*a* may include one air path on the front surface of the battery mounting plate 3220, wherein the air path has a groove or aperture shape.

The left-right type frame 3200-*b* may include two air paths on the front surface of the battery mounting plate 3220, wherein the air paths face each other in a left and right direction and have groove or aperture shapes.

The top-bottom type frame 3200-*c* may include two air paths on the front surface of the battery mounting plate 3220, wherein the air paths face each other in a top and bottom direction and have groove or aperture shapes.

Figure 14:
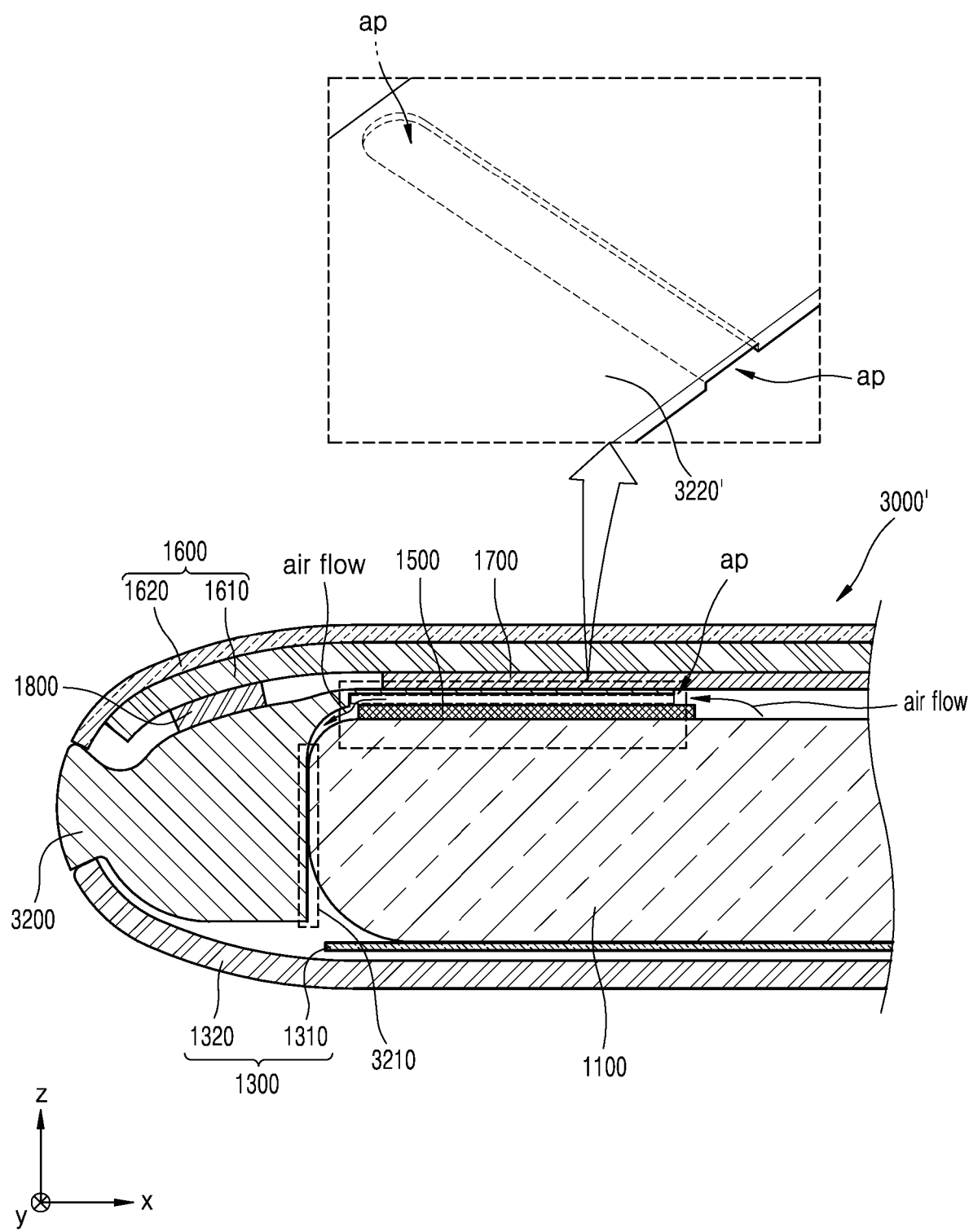
FIG. 14 is a cross-sectional view of an electronic device according to an embodiment, in which an air path is provided at a rear surface of a battery mounting plate, and a perspective view of a structure of an air path.
Figure 15:
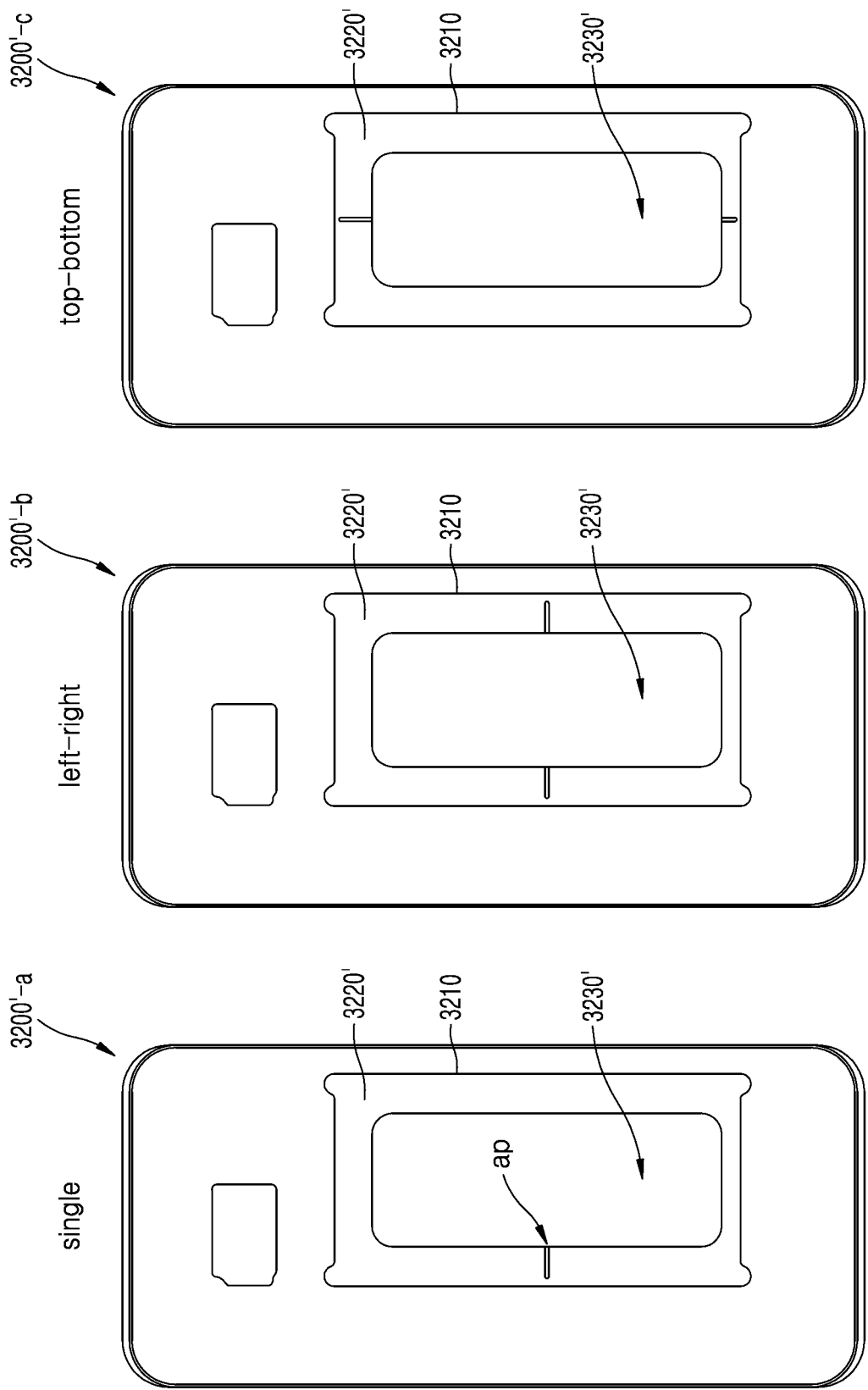
FIGS. 15A through 15C are diagrams showing rear surfaces of frames and locations of air paths, according to embodiments.

FIG. 14 is a cross-sectional view of an electronic device 3000' according to an embodiment, in which the air path ap is provided at a rear surface of a battery mounting plate 3220', and a perspective view of a structure of the air path ap. FIGS. 15A through 15C are diagrams showing rear surfaces of frame 3200'-*a* through 3200'-*c* and location of air paths, according to embodiments.

Components of the electronic device 3000' other than a frame 3200' are same as those described above with reference to FIG. 5, and thus descriptions thereof are not provided here for the sake of brevity.

Referring to the perspective view of FIG. 14, the air path ap may be formed on a rear surface of the battery mounting plate 3220' in an aperture or groove shape. The width of the air path ap may be set to 0.3 mm to 3 mm, but is not limited thereto. For example, the width of the air path ap may be 0.5 mm to 1.5 mm.

The air path ap may extend from an opening 3230' towards the battery rib 3210. The air path ap may extend sufficiently up to a point for contacting the external area, and such a point may be located between the battery rib 3210 and the opening 3230'. The thickness of the air path ap in a vertical direction may be set at a certain region such that the battery mounting plate 3220' maintains sufficient rigidity to support the battery 1100, and air is sufficiently circulated.

Referring to FIGS. 15A through 15C, the frame 3200' may include any one of a single type frame 3200'-*a*, a left-right type frame 3200'-*b*, and a top-bottom type frame 3200'-*c*, but is not limited thereto.

The single type frame 3200'-*a* may include one air path on the rear surface of the battery mounting plate 3220', wherein the air path has a groove or aperture shape.

The left-right type frame 3200'-*b* may include two air paths on the rear surface of the battery mounting plate 3220', wherein the air paths face each other in a left and right direction and have groove or aperture shapes.

The top-bottom type frame 3200'-*c* may include two air paths on the rear surface of the battery mounting plate 3220', wherein the air paths face each other in a top and bottom direction and have groove or aperture shapes.

Figure 16:
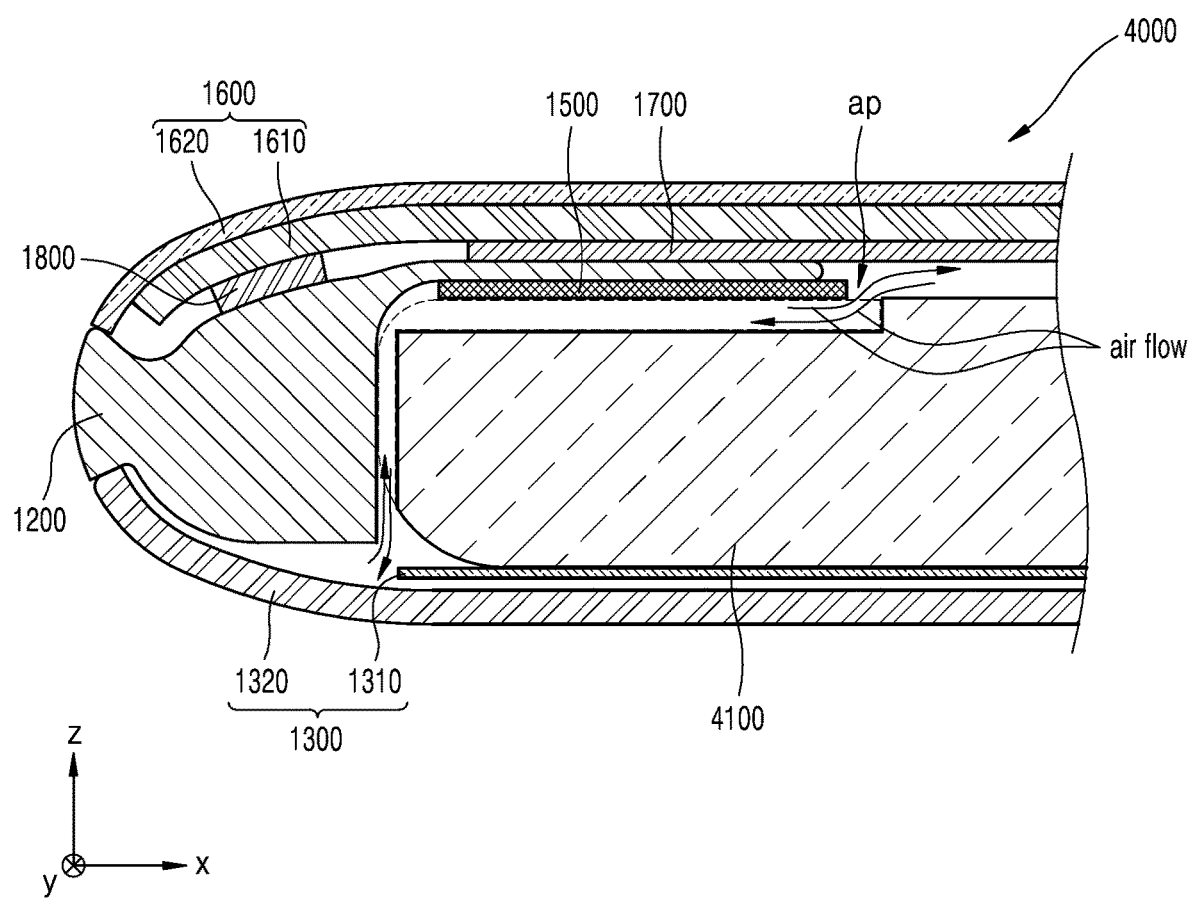
FIG. 16 is a cross-sectional view of an electronic device according to an embodiment, in which an air path is provided at a battery.
Figure 17A:
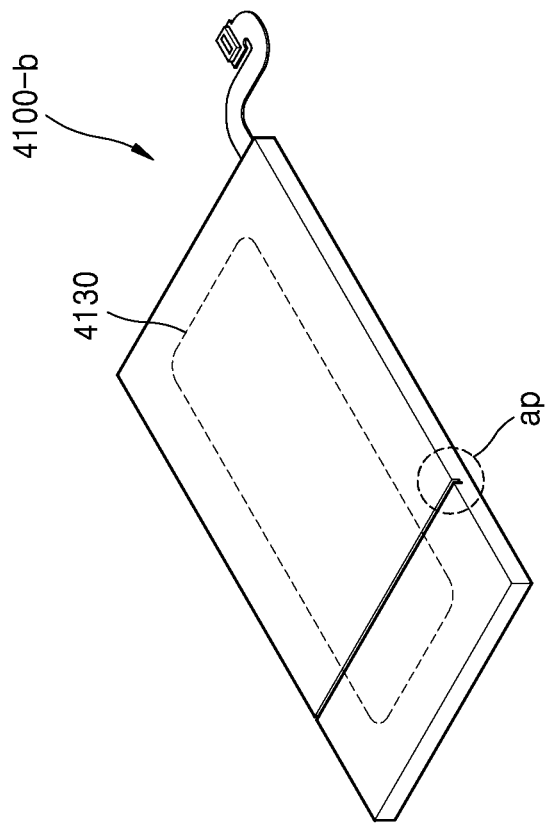
FIGS. 17A and 17B are diagrams showing batteries and locations of air paths, according to embodiments.
Figure 17B:
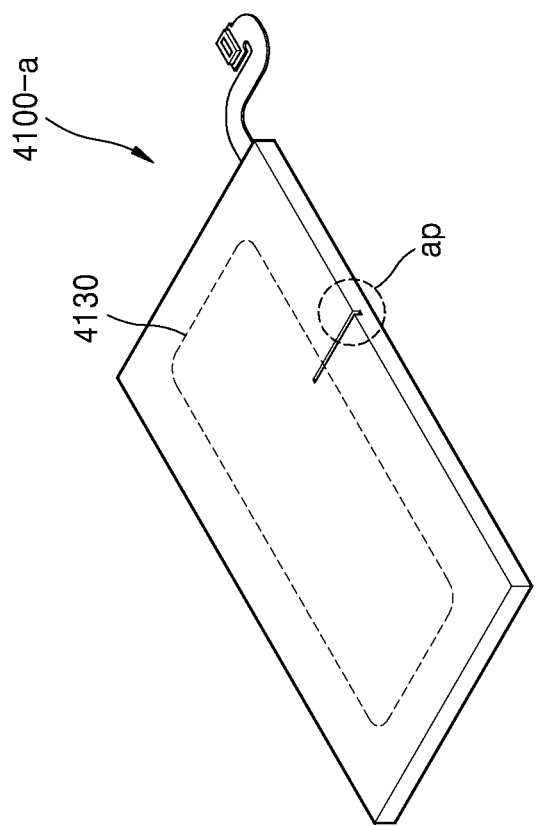

FIG. 16 is a cross-sectional view of an electronic device 4000 according to an embodiment, in which the air path ap is provided at a battery 4100. FIGS. 17A and 17B are diagrams showing batteries 4100-*a* and 4100-*b* and locations of air paths, according to embodiments.

Components of the electronic device 4000 other than the battery 4100 are same as those described above with reference to FIG. 5, and thus descriptions thereof are not provided here.

Referring to FIGS. 16 through 17B, the air path ap may be formed on at least a part of a front surface of the battery 4100 in a groove shape. Referring to FIG. 16, air in an exposed space adjacent to the front surface of the battery 4100 is not sealed, and this air may be circulated to the rear part 1300 through the air path ap. Accordingly, a space that permits swelling/expansion of the battery 4100 may be secured while the display module 1600 is prevented from being damaged by the swelling or expansion of the battery.

Referring to FIGS. 17A and 17B, the battery 4100 may include at least one of the first type battery 4100-*a* and the second type battery 4100-*b*, but is not limited thereto.

The first type battery 4100-*a* may include the air path ap extending from an opening corresponding region 4130 in an external direction.

The second type battery 4100-*b* may include the air path extending from the opening corresponding region 4130 in a lateral direction.

Figure 18:
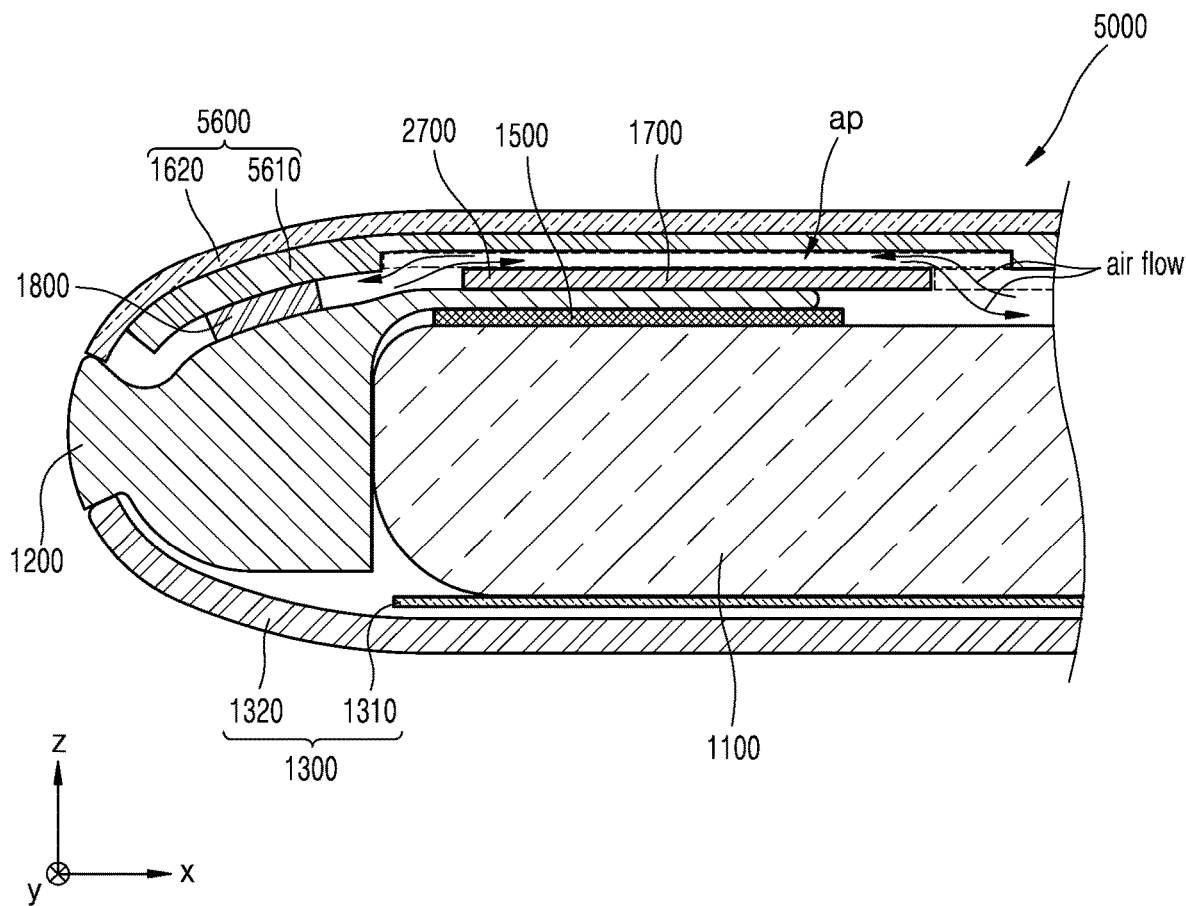
FIG. 18 is a cross-sectional view of an electronic device according to an embodiment, in which an air path is provided at a display module.
Figure 19:
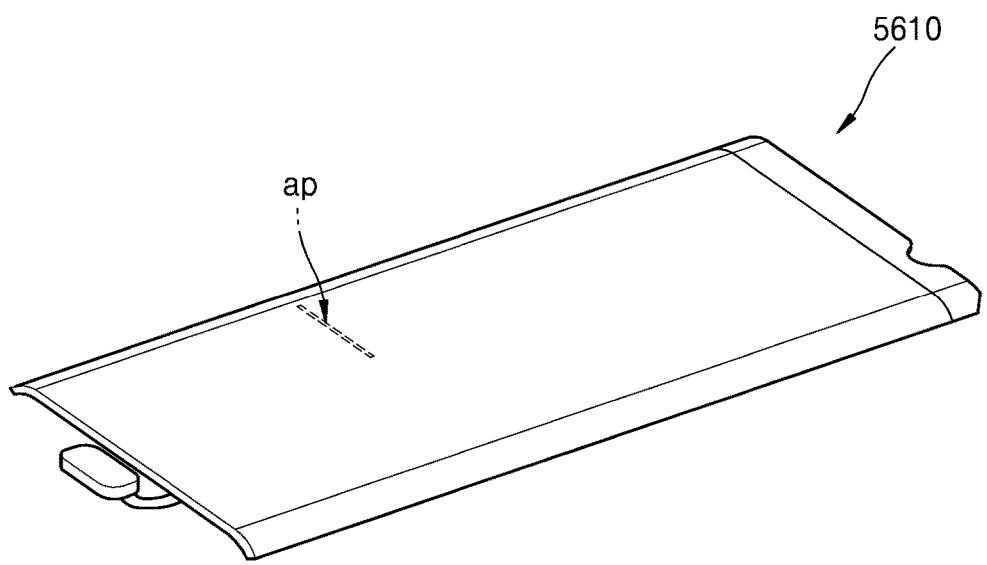
FIG. 19 is a diagram showing a display panel and a location of an air path, according to an embodiment.

FIG. 18 is a cross-sectional view of an electronic device 5000 according to an embodiment, in which the air path ap is provided at a display module 5600. FIG. 19 is a diagram showing a display panel 5610 and a location of the air path ap, according to an embodiment.

Components of the electronic device 5000 other than the display module 5600 are same as those described above with reference to FIGS. 5 and 10, and thus descriptions thereof are not provided here. The electronic device 5000 may include the display module 5600 including the air path ap, and an open type display tape 2700.

Referring to FIG. 18, the air path ap may be formed in at least a part of a rear surface of the display panel 5610. Accordingly, air on the top of the battery 1100 is not sealed but may be circulated to the external area along an opening of the display tape 2700' and the air path ap formed on the display panel 5610. Accordingly, a space that permits swelling/expansion of the battery 1100 may be secured and the display module 5600 may be prevented from being damaged by the swelling or expansion of the battery.

Referring to FIG. 19, the air path ap may be formed, for example, to on the display panel 5610 in a lateral direction. In detail, the air path ap may extend sufficiently up to a point for contacting the external area, but limited to a point before the waterproof tape adhering region.

As described above, the display module 5600 may include not only the display panel 5610, but also a polarizing sheet, a heat-dissipating sheet, a touch panel, an electromagnetic induction panel, an electromagnetic shielding sheet, and an adhesive sheet. In this case, the air path ap may also formed in the polarizing sheet, the heat-dissipating sheet, the touch panel, the electromagnetic induction panel, the electromagnetic shielding sheet, and the adhesive sheet, but is not limited thereto.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
a display screen configured to display an image;
a housing comprising a frame, and a rear part connected to a rear surface of the frame, wherein the frame includes a battery mounting structure forming a space where a battery is mountable;
a display tape adhering a rear surface of the display screen to a front surface of the frame; a battery mounted in the space of the battery mounting structure; a battery tape adhering the battery mounting structure to the battery; a chamber adjacent to the battery that is disposed between opposite facing surfaces of the display tape and the battery; and
an air path connecting the chamber to another space in the electronic device,
wherein the battery mounting structure includes a mounting plate forming an opening that exposes at least one portion of a front surface of the battery, and
wherein the chamber is formed by the at least one portion of a front surface of the battery exposed by the opening and the display tape
wherein a portion of the frame is directly sandwiched between a portion of the battery tape and a portion of the display tape, the portion of the frame being along a side of the chamber.

2. The electronic device of claim 1, wherein the battery tape has a closed loop shape including an inner surface and an outer surface.

3. The electronic device of claim 2, wherein the air path is provided in the battery tape and penetrates the inner surface and the outer surface.

4. The electronic device of claim 2, wherein the battery tape has uneven widths between the inner surface and the outer surface, and
the air path is provided in a region where the width between the inner surface and the outer surface is smallest.

5. The electronic device of claim 2, wherein the inner surface of the battery tape has a plurality of corner regions, and the air path is provided in at least one of the plurality of corner regions of the inner surface.

6. The electronic device of claim 1, wherein at least some parts of the air path face each other.

7. The electronic device of claim 1, wherein the air path is provided in the display tape.

8. The electronic device of claim 7, wherein the display tape includes an opening corresponding region, and the air path connects the opening corresponding region to an exterior of the display tape.

9. The electronic device of claim 7, wherein the air path connects to an opening corresponding region of the display tape, along a lateral direction.

10. The electronic device of claim 1, wherein the display tape forms an opening exposing an opening corresponding region.

11. The electronic device of claim 1, wherein the display tape forms an airtight chamber by sealing an opening corresponding region.

12. The electronic device of claim 1, wherein the air path is provided in the mounting plate.

13. The electronic device of claim 1, wherein the air path extends in a direction extending away from the opening of the mounting plate.

14. The electronic device of claim 1, wherein the battery mounting structure comprises a battery rib formed along a side surface of the battery such that the battery is held in place by the battery rib.

15. The electronic device of claim 1, wherein the air path is provided in the battery.

16. The electronic device of claim 15, wherein the air path extends in a direction extending away from an opening corresponding region of the battery.

17. The electronic device of claim 15, wherein the air path extends to connect to an opening corresponding region of the battery in a lateral direction.

18. The electronic device of claim 1, further comprising a waterproof tape provided between the display screen and the housing, wherein the waterproof tape is configured to block moisture.

19. The electronic device of claim 1, wherein the chamber adjacent to the battery is directly sandwiched between opposite facing surfaces of the display tape and the battery.

* * * * *